(12) United States Patent
Miyamoto

(10) Patent No.: US 12,146,812 B2
(45) Date of Patent: Nov. 19, 2024

(54) GAS INSPECTION MANAGEMENT SYSTEM, GAS INSPECTION MANAGEMENT METHOD, AND INSTRUCTIONS FOR GAS INSPECTION MANAGEMENT

(71) Applicant: Konica Minolta, Inc., Tokyo (JP)

(72) Inventor: Hiroyuki Miyamoto, Nara (JP)

(73) Assignee: Konica Minolta, Inc., Tokyo (JP)

( * ) Notice: Subject to any disclaimer, the term of this patent is extended or adjusted under 35 U.S.C. 154(b) by 293 days.

(21) Appl. No.: 17/905,181

(22) PCT Filed: Mar. 13, 2020

(86) PCT No.: PCT/JP2020/011176
§ 371 (c)(1),
(2) Date: Aug. 29, 2022

(87) PCT Pub. No.: WO2021/181675
PCT Pub. Date: Sep. 16, 2021

(65) Prior Publication Data
US 2023/0117395 A1    Apr. 20, 2023

(51) Int. Cl.
*G01M 3/18*    (2006.01)

(52) U.S. Cl.
CPC ..................... *G01M 3/18* (2013.01)

(58) Field of Classification Search
CPC .......... G01M 3/18; G01M 3/38; G06Q 10/00; G06Q 50/06
See application file for complete search history.

(56) References Cited

U.S. PATENT DOCUMENTS 8,866,637 B1    10/2014  Moses et al.
10,504,218 B2 *  12/2019  Finn ........................ G06F 16/40
(Continued)

FOREIGN PATENT DOCUMENTS

JP    2010-003190 A    1/2010
JP    2017-174127 A    9/2017
(Continued)

OTHER PUBLICATIONS

International Search Report issued in corresponding International Application No. PCT/JP2020/011176 mailed Jun. 2, 2020, with translation (7 pages).
(Continued)

*Primary Examiner* — David J Bolduc
(74) *Attorney, Agent, or Firm* — Osha Bergman Watanabe & Burton LLP

(57) ABSTRACT

A gas inspection management system includes: an inspection information database that stores inspection results and information on links to inspection images for objects of inspection; an access condition receiver that receives an input of an access request and an input of condition specification from a manager; a hardware processor that: selects part or all of the objects from the inspection information database, based on the access request, acquires information on the inspection results and the information on the links for the selected objects, and generates a display image including the information on the inspection results and the information on the links for the selected objects; and a display that displays the display image.

20 Claims, 25 Drawing Sheets

(56) References Cited

U.S. PATENT DOCUMENTS

| | | | | |
|---|---|---|---|---|
| 2013/0311634 A1* | 11/2013 | Raymond | ................. | H04L 9/40 |
| | | | | 709/223 |
| 2014/0200936 A1 | 7/2014 | Alphenaar et al. | | |
| 2017/0307465 A1* | 10/2017 | Yokono | ................... | G08B 21/20 |
| 2018/0032068 A1* | 2/2018 | Higgins | ................... | B64F 5/60 |

FOREIGN PATENT DOCUMENTS

| | | |
|---|---|---|
| WO | 2016/056297 A1 | 4/2016 |
| WO | 2016/143754 A1 | 9/2016 |
| WO | 2017/073430 A1 | 5/2017 |
| WO | 2018/043417 A1 | 3/2018 |
| WO | 2020/003644 A1 | 1/2020 |
| WO | 2020/008688 A1 | 1/2020 |
| WO | 2020/021785 A1 | 1/2020 |

OTHER PUBLICATIONS

Written Opinion issued in corresponding International Application No. PCT/JP2020/011176 mailed Jun. 2, 2020, with translation (12 pages).

\* cited by examiner

FIG. 3A

| INSPECTION ID | INSPECTION DATE | INSPECTION STARTING TIME | INSPECTION FINISHING TIME | INSPECTOR | SITE | FACILITY | EQUIPMENT |
|---|---|---|---|---|---|---|---|
| XXXXX01 | 2020, 03, 03 | 13:00 | 13:30 | Mike | Lion | North01 | TANK |

FIG. 3B

| INSPECTION ID | INSPECTION RESULT (STATUS) | EQUIPMENT | COMPONENT |
|---|---|---|---|
| XXXXX01 | INSPECTED LEAK | TANK | VALVE |

FIG. 3C

| INSPECTION ID | EQUIPMENT | INSPECTION RESULT LINK INFORMATION |
|---|---|---|
| XXXXX01 | TANK | https://www.kmmsbu/gas/inspect/data01 |

FIG. 5A

INSPECTION CONDITION INFORMATION DATABASE — 231

| INSPECTION ID | INSPECTION DATE | INSPECTION STARTING TIME | INSPECTION FINISHING TIME | INSPECTOR | SITE | FACILITY | EQUIPMENT |
|---|---|---|---|---|---|---|---|
| XXXX01 | 2020.03.03 | 13:00 | 13:30 | Mike | Lion | North01 | TANK |
| XXXX02 | 2020.03.03 | 13:40 | 14:20 | Mike | Lion | North02 | SEPARATOR |
| XXXX03 | 2020.03.04 | 15:00 | 15:30 | Mike | Lion | South01 | COMBUSTOR |
| . | . | . | . | . | . | . | . |
| . | . | . | . | . | . | . | . |
| XXXX0n | 2020.04.02 | 13:00 | 13:30 | Joe | Lion | West01 | TANK |

FIG. 5B

INSPECTION RESULT INFORMATION DATABASE — 232

| INSPECTION ID | STATUS | EQUIPMENT | COMPONENT |
|---|---|---|---|
| XXXX01 | UNINSPECTED | TANK | VALVE |
| XXXX02 | INSPECTED NO LEAK | SEPARATOR | PUMP |
| XXXX03 | INSPECTED LEAK | COMBUSTOR | JOINT |
| . | . | . | . |
| . | . | . | . |
| XXXX0n | REPAIRED | TANK | PIPE |

FIG. 5C

INSPECTION IMAGE LINK INFORMATION DATABASE — 233

| INSPECTION ID | COMPONENT | INSPECTION RESULT LINK INFORMATION |
|---|---|---|
| XXXX01 | VALVE | https://www.kmmsbu/gas/inspect/data01 |
| XXXX02 | PUMP | https://www.kmmsbu/gas/inspect/data02 |
| XXXX03 | JOINT | https://www.kmmsbu/gas/inspect/data03 |
| . | . | . |
| . | . | . |
| XXXX0n | PIPE | https://www.kmmsbu/gas/inspect/data0n |

FIG. 6A

234 — INSPECTION OBJECT LOCATION INFORMATION DATABASE

| SITE | FACILITY | EQUIPMENT | LOCATION INFORMATION (LATITUDE, LONGITUDE) |
|---|---|---|---|
| Lion | North01 | TANK | X1, Y1 |
| Lion | North02 | SEPARATOR | X2, Y2 |
| Lion | South01 | COMBUSTOR | X3, Y3 |
| . | . | . | . |
| . | . | . | . |
| Lion | West01 | TANK | X1, Yn |
| Tiger | | | |

FIG. 6B

235 — MAP INFORMATION DATABASE

| SITE | FACILITY | MAP LINK INFORMATION |
|---|---|---|
| Lion | North01 | https://www.kmmsbu/gas/map/data01 |
| Lion | North02 | https://www.kmmsbu/gas/map/data02 |
| Lion | South01 | https://www.kmmsbu/gas/map/data03 |
| . | . | . |
| . | . | . |
| Lion | West01 | https://www.kmmsbu/gas/map/data0n |
| Tiger | | |

FIG. 6C

236 — INSPECTION ROUTE INFORMATION DATABASE

| SITE | FACILITY | ROUTE 1 | ROUTE 2 | ROUTE 3 |
|---|---|---|---|---|
| Lion | North01 | TANK | SEPARATOR | COMBUSTOR |
| Lion | North02 | SEPARATOR | COMBUSTOR | SEPARATOR |
| Lion | South01 | COMBUSTOR | TANK | COMBUSTOR |
| . | . | . | . | . |
| . | . | . | . | . |
| Lion | West01 | TANK | SEPARATOR | COMBUSTOR |
| Tiger | | | | |

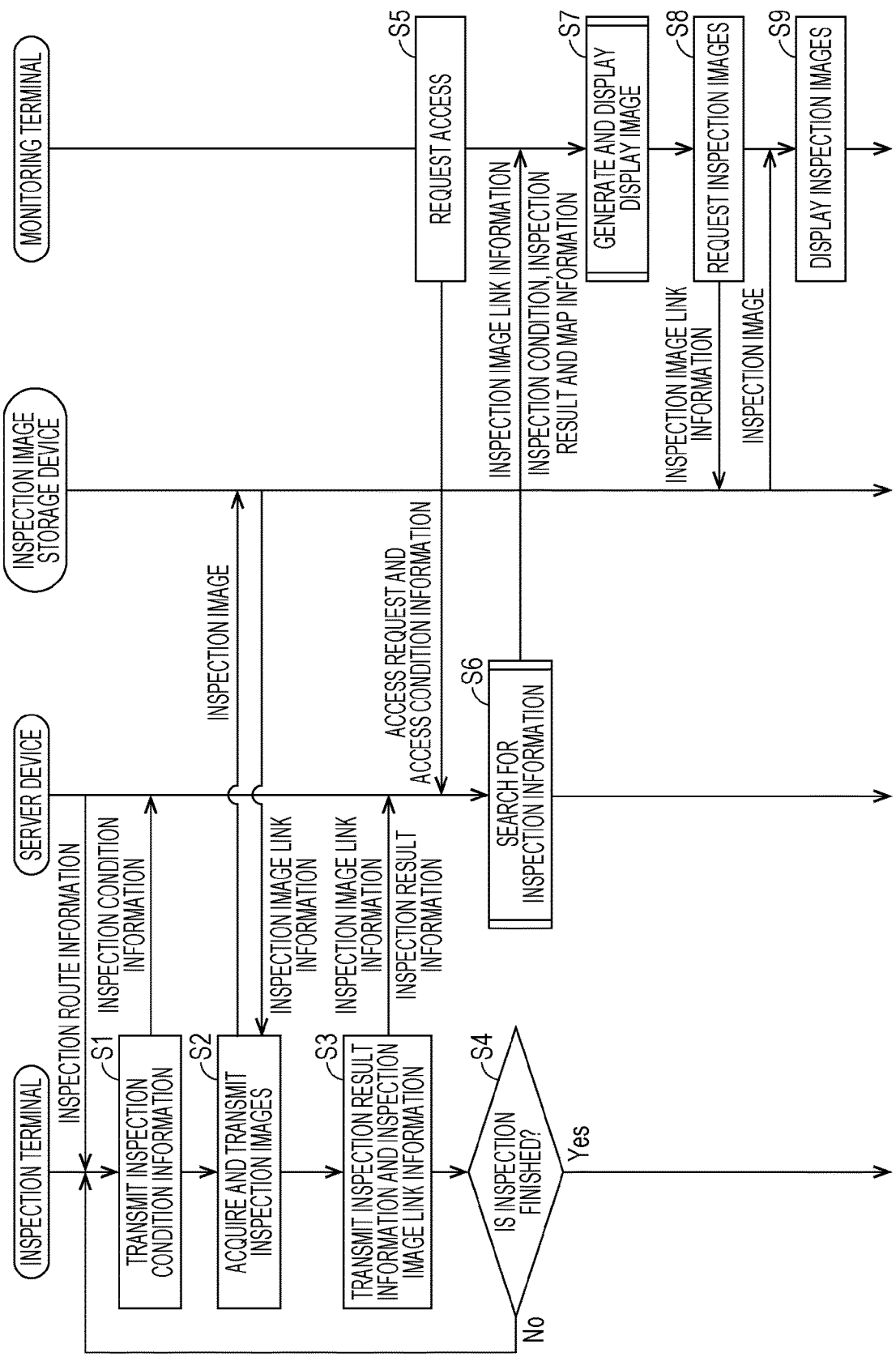

FIG. 10

| ITEM | INFORMATION STORED IN SERVER DEVICE ||||||||||||||
| --- | --- | --- | --- | --- | --- | --- | --- | --- | --- | --- | --- | --- | --- | --- |
| | INSPECTION ID | INSPECTION DATE | INSPECTION STARTING TIME | INSPECTION FINISHING TIME | INSPECTOR | SITE | FACILITY | EQUIPMENT | COMPONENT | INSPECTION IMAGES | NUMBER OF INSPECTION IMAGES | TRANSMISSION TIME | INSPECTION RESULT (STATUS) | INSPECTION IMAGE LINK INFORMATION |
| INSPECTION CONDITION INPUT | ✔ | ✔ | ✔ | ✔ | ✔ | ✔ | ✔ | ✔ | | | | | | |
| INSPECTION IMAGE TRANSMISSION | ✔ | | | | | | | ✔ | | ✔ | ✔ | ✔ | | |
| INSPECTION RESULT INPUT | ✔ | | | | | | | ✔ | ✔ | | | | ✔ | ✔ |

FIG. 11

| CATEGORY | ACCESS REQUEST | INSPECTION ID | INSPECTION DATE | INSPECTION STARTING TIME | INSPECTION FINISHING TIME | INSPECTOR | SITE | FACILITY | EQUIPMENT | COMPONENT | INSPECTION IMAGES | INSPECTION RESULTS (STATUSES) | NUMBER OF LEAK OCCURRENCES | INSPECTION IMAGE LINK INFORMATION | MAP INFORMATION | LOCATION INFORMATION | INSPECTION IMAGES |
|---|---|---|---|---|---|---|---|---|---|---|---|---|---|---|---|---|---|
| MAP DISPLAY | MAP DISPLAY OF FACILITIES' LATEST INSPECTION RESULTS (STATUSES) | ✓ | ✓ | ✓ | ✓ | ✓ | ✓ | ✓ | ✓ | ✓ | ✓ | ✓ | ✓ | ✓ | ✓ | ✓ | |
| MAP DISPLAY | MAP DISPLAY OF ABNORMAL FACILITIES | ✓ | ✓ | ✓ | ✓ | ✓ | ✓ | ✓ | ✓ | ✓ | ✓ | ✓ | ✓ | ✓ | ✓ | ✓ | |
| MAP DISPLAY | MAP DISPLAY OF HISTORY OF INSPECTION IN EQUIPMENT | ✓ | ✓ | ✓ | ✓ | ✓ | ✓ | ✓ | ✓ | ✓ | ✓ | ✓ | ✓ | ✓ | ✓ | ✓ | |
| LIST DISPLAY | LIST DISPLAY OF FACILITIES' LATEST INSPECTION RESULTS (STATUSES) | ✓ | ✓ | ✓ | ✓ | ✓ | ✓ | ✓ | ✓ | ✓ | ✓ | ✓ | ✓ | ✓ | | | |
| LIST DISPLAY | LIST DISPLAY OF ABNORMAL FACILITIES | ✓ | ✓ | ✓ | ✓ | ✓ | ✓ | ✓ | ✓ | ✓ | ✓ | ✓ | ✓ | ✓ | | | |
| LIST DISPLAY | LIST DISPLAY OF LEAKAGE RATES OF ALL FACILITIES | ✓ | ✓ | ✓ | ✓ | ✓ | ✓ | ✓ | ✓ | ✓ | ✓ | ✓ | ✓ | ✓ | | | |
| LIST DISPLAY | LIST DISPLAY OF INSPECTION HISTORY OF SPECIFIC FACILITY | ✓ | ✓ | ✓ | ✓ | ✓ | ✓ | ✓ | ✓ | ✓ | ✓ | ✓ | ✓ | ✓ | | | |
| LIST DISPLAY | LIST DISPLAY OF EQUIPMENT'S ABNORMALITY RATES | ✓ | ✓ | ✓ | ✓ | ✓ | ✓ | ✓ | ✓ | ✓ | ✓ | ✓ | ✓ | ✓ | | | |
| LIST DISPLAY | LIST DISPLAY OF HISTORY OF INSPECTION IN EQUIPMENT | ✓ | ✓ | | | ✓ | ✓ | ✓ | ✓ | ✓ | ✓ | ✓ | | | | | |
| INSPECTION IMAGE REPRODUCTION | SPECIFICATION OF DATE, SITE, AND FACILITY, AND REPRODUCTION OF INSPECTION IMAGES | ✓ | ✓ | | | | | | | | | ✓ | | | | | ✓ |

FIG. 18

| INSPECTION DATE ▶ | FACILITY ▶ | LEAK ▶ | REPAIRED ▶ |
|---|---|---|---|
| 2019/9/11 | North1 | | |
| 2019/9/11 | South3 | ▲ | |
| 2019/9/8 | East3 | ▲ | ▲ |
| 2019/9/7 | West2 | ▲ | ▲ |
| 2019/9/6 | North3 | ▲ | ▲ |
| 2019/9/1 | Center6 | ▲ | ▲ |

INSPECTION DATE

OBJECTS OF DISPLAY (ABNORMAL FACILITIES)

STATUS

LEAK

FIG. 20

OBJECTS OF DISPLAY (ALL FACILITIES)
INSPECTION DATE
INSPECTOR
LEAKAGE RATE

| FACILITY | INSPECTION DATE | INSPECTOR | TIME | | | NUMBER OF IMAGES | LEAK | NO LEAK | LEAKAGE RATE | |
| --- | --- | --- | --- | --- | --- | --- | --- | --- | --- | --- |
| | | | FirstTak | FinalTak | Total | | | | LEAK | NO LEAK |
| East01 | 19-Sep-19 | Mike | 10:50 | 11:35 | 0:45 | 8 | 8 | 0 | 0% | 100% |
| East02 | 19-Sep-19 | Mike | 12:35 | 13:52 | 1:17 | 8 | 7 | 1 | 13% | 88% |
| East03 | 19-Sep-19 | Mike | 14:39 | 16:09 | 1:29 | 8 | 8 | 0 | 0% | 100% |
| North01 | 16-Sep-19 | Joe | 10:36 | 11:37 | 1:00 | 8 | 8 | 0 | 0% | 100% |
| North02 | 16-Sep-19 | Joe | 12:20 | 13:38 | 1:18 | 8 | 8 | 0 | 0% | 100% |
| North03 | 16-Sep-19 | Joe | 13:41 | 15:13 | 1:32 | 8 | 8 | 0 | 0% | 100% |
| South01 | 12-Sep-19 | Beth | 10:29 | 10:56 | 0:26 | 8 | 7 | 1 | 13% | 88% |
| South02 | 12-Sep-19 | Beth | 12:19 | 12:27 | 0:07 | 8 | 7 | 1 | 13% | 88% |
| South03 | 12-Sep-19 | Beth | 13:20 | 14:52 | 1:32 | 8 | 8 | 0 | 0% | 100% |
| West01 | 9-Sep-19 | Beth | 11:52 | 13:21 | 1:28 | 8 | 7 | 1 | 13% | 88% |
| West02 | 9-Sep-19 | Beth | 14:14 | 15:07 | 0:52 | 8 | 8 | 0 | 0% | 100% |
| West03 | 9-Sep-19 | Beth | 15:39 | 15:45 | 0:05 | 8 | 8 | 0 | 0% | 100% |

FIG. 22

OBJECTS OF DISPLAY (SPECIFIC FACILITIES)

- SITE: Li
- FACILITY: Lion

INSPECTOR

[Apply]

| INSPECTION DATE | INSPECTOR | TIME Inspection | TIME Final tak | TIME Total | NUMBER OF IMAGES LEAK | NO LEAK | LEAK | LEAKAGE RATE LEAK | LEAKAGE RATE NO LEAK |
|---|---|---|---|---|---|---|---|---|---|
| 19-Sep-19 | Mike | 10:36 | 12:06 | 1:29 | 8 | 0 | 8 | 0% | 100% |
| 19-Aug-19 | Beth | 11:20 | 12:18 | 0:57 | 8 | 1 | 7 | 13% | 88% |
| 19-Jul-19 | Joe | 10:26 | 11:48 | 1:21 | 8 | 0 | 8 | 0% | 100% |
| 18-Jun-19 | Mike | 11:07 | 11:27 | 0:20 | 8 | 0 | 8 | 0% | 100% |
| 18-May-19 | Beth | 11:00 | 12:12 | 1:12 | 8 | 0 | 8 | 0% | 100% |
| 17-Apr-19 | Joe | 11:28 | 12:32 | 1:03 | 8 | 0 | 8 | 0% | 100% |
| 17-Mar-19 | Mike | 11:36 | 12:44 | 1:08 | 8 | 1 | 7 | 13% | 88% |
| 14-Feb-19 | Beth | 11:41 | 12:56 | 1:14 | 8 | 1 | 7 | 13% | 88% |
| 14-Jan-19 | Joe | 11:42 | 12:02 | 0:19 | 8 | 0 | 8 | 0% | 100% |
| 14-Dec-18 | Mike | 11:37 | 13:12 | 1:35 | 8 | 1 | 7 | 13% | 88% |
| 13-Nov-18 | Beth | 11:35 | 12:10 | 0:34 | 8 | 0 | 8 | 0% | 100% |

INSPECTION DATE → (column label)
INSPECTOR → (column label)
LEAKAGE RATE → (column label)

FIG. 24

OBJECTS OF DISPLAY
(EQUIPMENT)

INSPECTION PERIOD

LEAKAGE RATE

| CATEGORY | ☑ FACILITY | ☑ EQUIPMENT | ☐ COMPONENT | ☐ INSPECTOR | |
|---|---|---|---|---|---|
| PERIOD | 2018.1.1 | TO | 2018.12.31 | | Apply |

| FACILITY | EQUIPMENT | COMPONENT | INSPECTOR | FREQUENCY | LEAKAGE RATE |
|---|---|---|---|---|---|
| North02 | Separator | – | – | 12 | 100% |
| East02 | Tank | – | – | 10 | 83% |
| South03 | Separator | – | – | 6 | 50% |
| South01 | Well Fead | – | – | 4 | 33% |
| West02 | Separator | – | – | 3 | 25% |
| North03 | Separator | – | – | 3 | 25% |
| West03 | Tank | – | – | 2 | 17% |
| South02 | Separator | – | – | 2 | 17% |
| West01 | Combastor | – | – | 1 | 8% |
| North01 | Separator | – | – | 1 | 8% |
| East03 | Separator | – | – | 1 | 8% |
| East01 | Separator | – | – | 1 | 8% |

FIG. 26

| OBJECTS OF DISPLAY (SPECIFIC EQUIPMENT) | | | INSPECTOR | INSPECTION DATE | TIME (START AND FINISH) | | | | | LEAKAGE RATE | |
|---|---|---|---|---|---|---|---|---|---|---|---|
| FACILITY | EQUIPMENT | COMPONENT | INSPECTOR | INSPECTION DATE | First Take | Final take | Total | NUMBER OF IMAGES | LEAK | NO LEAK | LEAK | NO LEAK |
| South03 | Separator | Valve | Mike | 19-Dec-18 | 10:29 | 11:44 | 1:15 | 8 | 2 | 6 | 25% | 75% |
| South03 | Separator | Joint | Mike | 13-Oct-18 | 12:37 | 14:12 | 1:34 | 8 | 1 | 7 | 13% | 88% |
| South03 | Separator | Valve | Joe | 14-Sep-18 | 14:31 | 14:53 | 0:22 | 8 | 1 | 7 | 13% | 88% |
| South03 | Separator | Cover | Joe | 2-Jun-18 | 11:46 | 12:05 | 0:19 | 8 | 3 | 5 | 38% | 63% |
| South03 | Separator | Valve | Mike | 1-May-18 | 12:27 | 12:44 | 0:16 | 8 | 1 | 7 | 13% | 88% |
| South03 | Separator | Valve | Joe | 20-Jan-18 | 14:06 | 15:08 | 1:02 | 8 | 1 | 7 | 13% | 88% |

☐ Show all

GAS INSPECTION MANAGEMENT SYSTEM, GAS INSPECTION MANAGEMENT METHOD, AND INSTRUCTIONS FOR GAS INSPECTION MANAGEMENT

BACKGROUND

Technical Field

The present disclosure relates to a gas inspection management system, a gas inspection management method, and instructions for managing the results of gas-leak inspections in facilities using gas.

Description of Related Art

In facilities using gas (hereinafter, also referred to as "gas facilities") such as production facilities that produce natural gas or oil, production plants that produce chemical products using gas, and gas pipeline facilities, patrol inspections have been performed in which workers regularly go around facilities to inspect them for gas leaks, repair them when gas leaks are found, and inspect them again for gas leaks.

Gas-leak inspections can be performed using an optical gas-leak detection method that detects gas leaks in an area under inspection by taking an infrared video using the infrared absorption characteristics of gas (e.g., Patent Documents 1 and 2).

The gas detection method using an infrared video can visualize gas with images, and thus advantageously allows easy detection of an emitted state of gas such as a flow thereof and a leaking location. Further, the state of leaked gas is recorded as images, which can thus be advantageously used as evidence of the gas-leak occurrence and its restoration.

In recent years, regulations on methane gas emission in gas development have been tightened up in connection with global warming, and gas facilities have been required to ensure safety. For this, for example, Patent Document 3 discloses a gas-leak data collection method in which objects of inspection on an inspection route in a patrol inspection are displayed as icons to convey them to a gas-leak inspector, and obtained inspection images are associated with information related to the objects of inspection and stored in a database.

PATENT DOCUMENTS

Patent Document 1: WO 2016/143754 A
Patent Document 2: WO 2017/073430 A
Patent Document 3: U.S. Pat. No. 8,866,637

However, the gas-leak data collection method described in Patent Document 3 does not describe a method of using collected data such as how to display and use inspection images associated with information related to objects of inspection.

In order to grasp the statuses of gas-leak occurrence and restoration in gas facilities to efficiently perform inspection and restoration according to the statuses, there is a demand for a gas inspection management method in which gas-leak inspection image data is stored in association with inspection information, and these are easily used for facility safety management.

SUMMARY

The present disclosure may provide a gas inspection management system, a gas inspection management method, and instructions capable of displaying the status of gas-leak occurrence and restoration in a gas facility in an easy-to-understand manner by displaying inspection images of a gas-leak inspection in association with information on the result of the inspection of an object of inspection.

A gas inspection management system according to one or more embodiments includes: an inspection information database that stores inspection results and information on links to inspection images for a plurality of objects of inspection; an access condition input unit (a receiver) that accepts (receives) input of an access request and condition specification from a manager; an inspection information acquisition unit (a hardware processor) that selects part or all of the plurality of objects of inspection from the inspection information database, based on the access request, and acquires information on inspection results and information on links to inspection images for the selected objects of inspection; a display image generation unit (the hardware processor) that generates a display image including the information on the inspection results and the information on the links to the inspection images for the selected objects of inspection; and a display unit (a display) that displays the display image.

The gas inspection management system, the gas inspection management method, and the instructions stored in a non-transitory recording medium according to one or more embodiments can display the statuses of gas-leak occurrence and restoration in gas facilities in an easy-to-understand manner by displaying information on the results of inspections of objects of inspection in association with inspection images. As a result, a manager of the gas facility can accurately grasp the gas-leak status of the gas facility.

BRIEF DESCRIPTION OF THE DRAWINGS

FIG. 3A is a diagram illustrating an example of inspection condition information, inspection result information, and inspection image link information transmitted from the inspection terminal according to one or more embodiments.

FIG. 3B is a diagram illustrating an example of inspection condition information, inspection result information, and inspection image link information transmitted from the inspection terminal according to one or more embodiments.

FIG. 3C is a diagram illustrating an example of inspection condition information, inspection result information, and inspection image link information transmitted from the inspection terminal according to one or more embodiments.

FIG. 5A is a diagram illustrating an example of an inspection condition information, an inspection result information, and an inspection image link information stored in the server device according to one or more embodiments.

FIG. 5B is a diagram illustrating an example of an inspection condition information, an inspection result information, and an inspection image link information stored in the server device according to one or more embodiments.

FIG. 5C is a diagram illustrating an example of an inspection condition information, an inspection result information, and an inspection image link information stored in the server device according to one or more embodiments.

FIG. 6A is a diagram illustrating an example of an inspection object location information, a map information, and an inspection route information stored in the server device according to one or more embodiments.

FIG. 6B is a diagram illustrating an example of an inspection object location information, a map information, and an inspection route information stored in the server device according to one or more embodiments.

FIG. 6C is a diagram illustrating an example of an inspection object location information, a map information, and an inspection route information stored in the server device according to one or more embodiments.

FIG. 9 is a sequence diagram illustrating an example of operation of the gas inspection management system according to one or more embodiments.

FIG. 10 is a diagram illustrating an example of information stored in the server device according to one or more embodiments based on the inspection condition information, the inspection result information, and the inspection image link information transmitted from the inspection terminal according to one or more embodiments.

FIG. 11 is a diagram illustrating an example of information transmitted from the server device according to one or more embodiments to the monitoring terminal according to one or more embodiments based on information on access conditions transmitted from the monitoring terminal according to one or more embodiments.

FIG. 18 is an example of an image displayed on the monitoring terminal according to one or more embodiments by the process to display abnormal facilities on a list.

FIG. 20 is an example of an image displayed on the monitoring terminal according to one or more embodiments by a process to display all facilities in descending order of leakage rates on a list.

FIG. 22 is an example of an image displayed on the monitoring terminal according to one or more embodiments by the process to display an inspection history of a specific facility on a list.

FIG. 24 is an example of an image displayed on the monitoring terminal according to one or more embodiments by the process to display the abnormality rates of pieces of equipment in descending order on a list.

FIG. 26 is an example of an image displayed on the monitoring terminal according to one or more embodiments by a process to display a history of inspections in a piece of equipment of a specific facility on a list.

DETAILED DESCRIPTION

Embodiments

<Configuration of Gas Inspection Management System>

One or more embodiments of the present disclosure are implemented as a gas inspection management system 1 that collects and manages gas-leak inspection results and inspection images of gas facilities. Hereinafter, the gas inspection management system 1 according to one or more embodiments will be described in detail with reference to the drawings.

Figure 1:
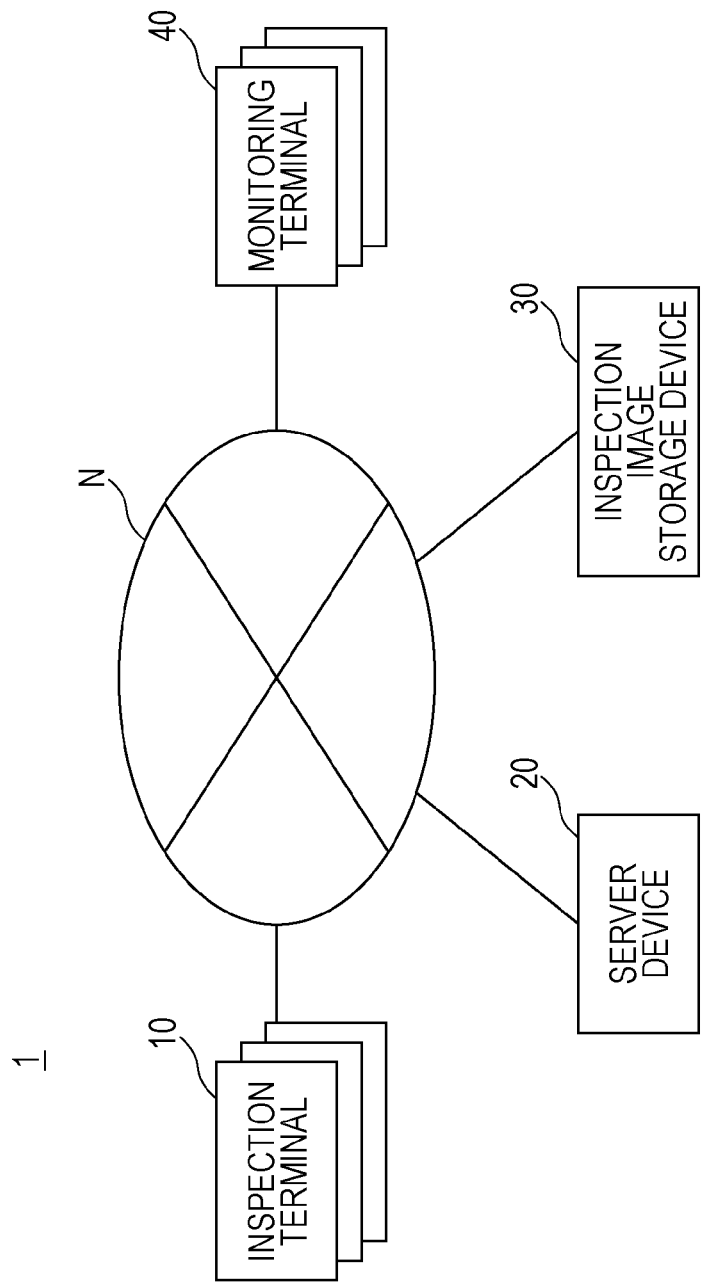
FIG. 1 is a schematic configuration diagram of a gas inspection management system according to one or more embodiments.

FIG. 1 is a schematic configuration diagram of the gas inspection management system 1 according to one or more embodiments. As illustrated in FIG. 1, the gas inspection management system 1 includes a server device 20, a plurality of inspection terminals 10, an inspection image storage device 30, and a plurality of monitoring terminals 40 connected to a communication network N.

The communication network N is, for example, the Internet, to which the server device 20, the inspection terminals 10, the inspection image storage device 30, and the monitoring terminals 40 are connected so as to be able to exchange information with one another.

(Inspection Terminals 10)

Hereinafter, a configuration of each inspection terminal 10 will be described.

The inspection terminal 10 is a dedicated terminal device used when an inspector who is an operator inspects gas facilities for gas leaks. The inspection terminal 10 is provided as a client computer that implements functions by a central processing unit (CPU) executing a program, and is connected to the communication network N via a wireless base station.

For the gas facilities, one site (area) includes a plurality of facilities, and each facility includes a plurality of pieces of equipment (apparatuses). In a gas-leak inspection of a gas facility, for a plurality of pieces of equipment included in the facility, the inspector acquires an infrared video including a plurality of image frames as inspection images for each piece of equipment, evaluates and determines the presence or absence of gas leaks in objects of inspection, based on the inspection images, and transmits the obtained inspection images to the inspection image storage device 30 via the communication network N for storage.

Figure 2:
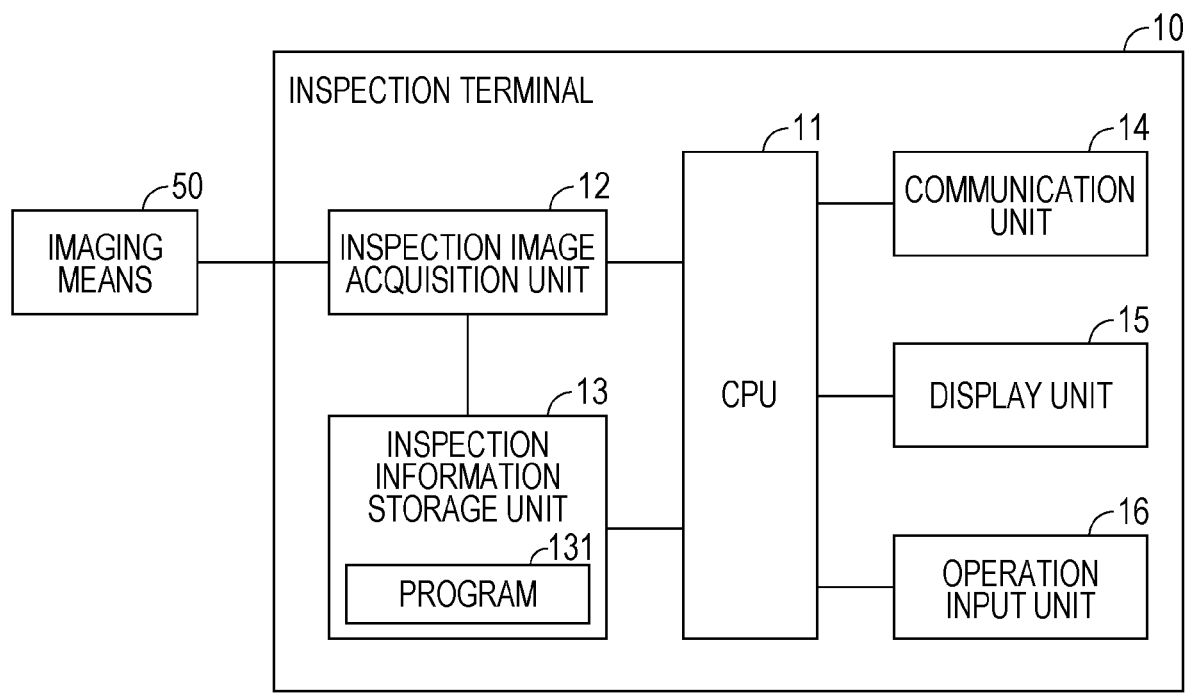
FIG. 2 is a diagram illustrating a configuration of an inspection terminal according to one or more embodiments.

FIG. 2 is a diagram illustrating a configuration of each inspection terminal 10. As illustrated in FIG. 2, the inspection terminal 10 is a client computer including a CPU 11, an inspection image acquisition unit 12, an inspection information storage unit 13, a communication unit 14, a display unit 15, and an operation input unit 16.

The CPU 11 implements the functions of the inspection terminal 10 by executing a program stored in the inspection information storage unit 13.

The inspection image acquisition unit 12 is, for example, an interface circuit that is connected to an imaging means 50 including an infrared camera that detects and images infrared rays, and acquires inspection images obtained by imaging objects of inspection. Images taken by the infrared camera are typically used for detecting hydrocarbon-based gas. The obtained inspection images are stored in the inspection information storage unit 13 as, for example, a video signal of 30 frames per second. The inspection images that have been temporarily stored in the inspection information storage unit 13 are transferred to the inspection image storage device 30 for storage via the communication network N, based on operation input to the operation input unit 16.

The inspection information storage unit 13 stores inspection condition information indicating inspection conditions and inspection result information indicating an inspection result, which are input by the inspector via the operation input unit 16 to be described later, inspection image link information, and inspection images captured by the imaging means 50. The inspection information storage unit 13 also stores a program 131 that is operated by the inspection terminal 10 and is necessary to implement a known optical gas-leak detection method described in, for example, Patent Literatures 1 and 2 etc., for detecting gas leaks in objects of inspection from inspection images, and others, and further has a function as a temporary storage area for temporarily storing the results of calculation by the CPU 21. The CPU 11 implements the function of the optical gas-leak detection method by executing the program 131. Specifically, when there is a region where frequency components are absorbed by hydrocarbon-based gas in an infrared image obtained by imaging an object of inspection, for example, the amount of the gas in that region is converted into color information, and the color information is mapped to display a gas leak.

The inspection information storage unit 13 includes a volatile memory such as a DRAM and a nonvolatile memory such as a hard disk. Inspection images corresponding to the inspection condition information are transmitted and stored.

The communication unit 14 transmits and receives information to and from the server device 20.

The display unit 15 is, for example, a display device such as a liquid crystal panel or an organic EL display, and displays a display screen generated by the CPU 11.

The operation input unit 16 is an input device on which the inspector who is the operator performs input to operate the inspection terminal 10. For example, it is implemented as an input device such as a touch panel with a touch sensor disposed on the front surface of the display unit 15.

Next, with reference to FIGS. 3A, 3B, and 3C, the inspection condition information, the inspection result information, and the inspection image link information stored in the inspection information storage unit 13 will be described.

FIG. 3A is an example of the inspection condition information. As illustrated in FIG. 3A, the inspection condition information includes information on the inspector and a site, a facility, and equipment as an object of inspection, which are input to the operation input unit 16 by the inspector when performing a gas-leak inspection of a gas facility, information on an inspection date, an inspection starting time, and an inspection finishing time based on a date and times provided from a clock means (not illustrated), and information on an inspection ID that is set each time an inspection is performed.

FIG. 3B is an example of the inspection result information. As illustrated in FIG. 3B, the inspection result information includes information on an inspection result indicating the gas-leak status of the object of inspection, which is evaluated and determined by the inspector based on inspection images corresponding to the inspection condition information, and input to the operation input unit 16, and information on a component (part) in which the inspection result has been confirmed by the inspector.

FIG. 3C is an example of the inspection image link information. As illustrated in FIG. 3C, the inspection image link information includes information on the link destination of the inspection images, such as a uniform resource locator (URL) of the inspection image storage device 30 to which the inspection images corresponding to the inspection condition information have been transferred for storage, and information on the equipment (apparatus) imaged in the inspection images.

(Server Device 20)

Figure 4:
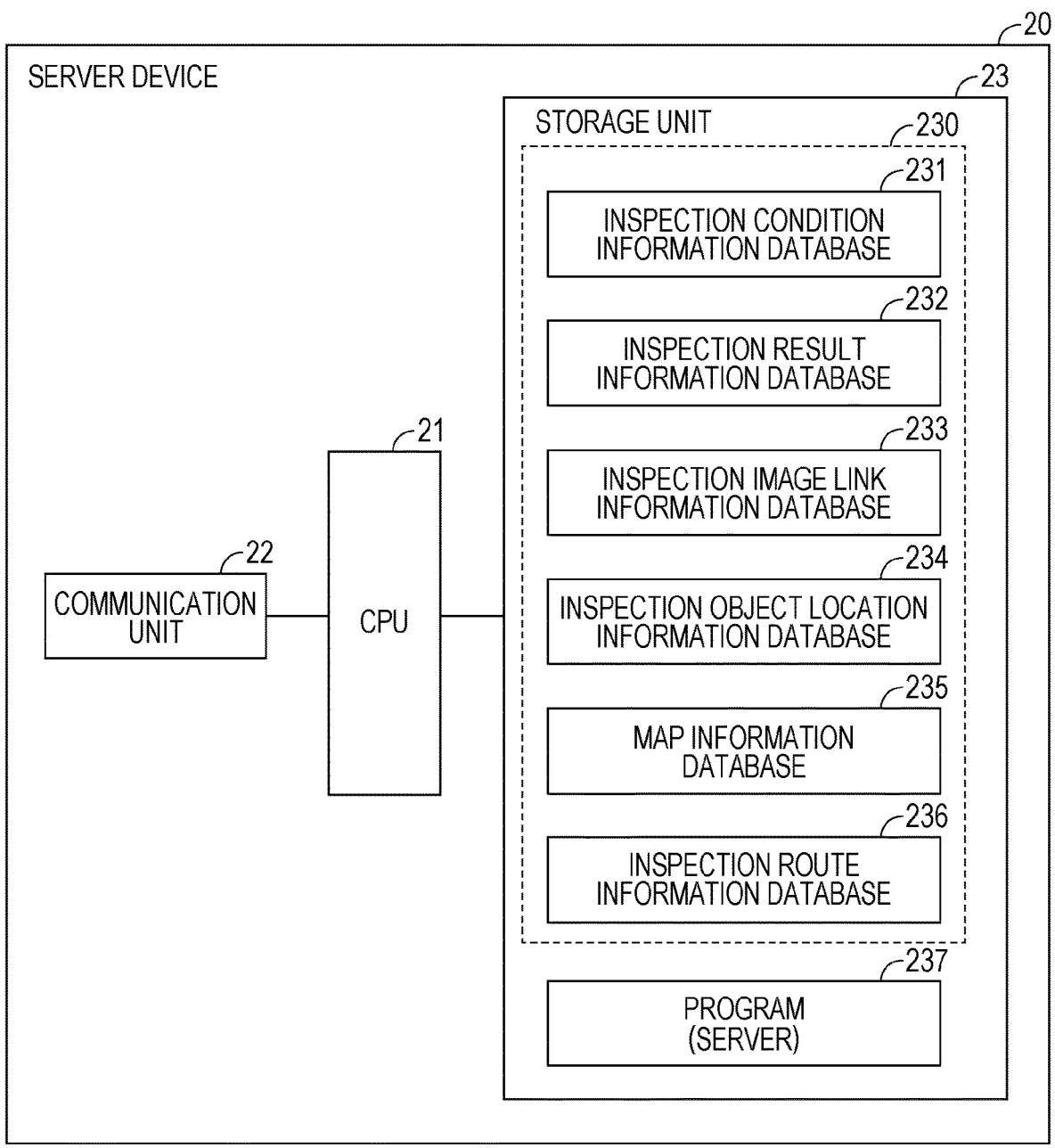
FIG. 4 is a diagram illustrating a configuration of a server device according to one or more embodiments.

The following describes a configuration of the server device 20. FIG. 4 is a diagram illustrating a configuration of the server device 20. As illustrated in FIG. 4, the server device 20 includes a CPU 21, a communication unit 22, and a storage unit 23, and is provided as a server computer that executes a program by the CPU 21.

The CPU 11 implements the functions of the server device 20 by executing a program 237 stored in the storage unit 23. Specifically, the CPU 11 acquires an access request and access conditions from a manager input from an access condition input unit 45 via the communication unit 22. The CPU 11 functions as an inspection information acquisition unit that selects part or all of a plurality of objects of inspection from an inspection information database 230 of the storage unit 23, based on the acquired access request and access conditions, and acquires information on the results of inspections of the selected objects of inspection and information on links to inspection images.

The storage unit 23 includes the inspection information database 230. The inspection information database 230 stores an inspection condition information database 231, an inspection result information database 232, an inspection image link information database 233, an inspection object location information database 234, a map information database 235, and an inspection route information database 236. The storage unit 23 also stores the program 237 necessary for the server device 20 to operate. Further, it has a function as a temporary storage area for temporarily storing the results of calculation by the CPU 21. The storage unit 23 includes a volatile memory such as a dynamic random-access memory (DRAM) and a nonvolatile memory such as a hard disk.

The communication unit 22 transmits and receives information to and from the inspection terminals 10 and the monitoring terminals 40.

The following describes information stored in the storage unit 23 with reference to FIGS. 5 and 6.

FIGS. 5A to 5C are diagrams illustrating an example of the inspection condition information database 231, the inspection result information database 232, and the inspection image link information database 233 stored in the server device 20. As illustrated in FIGS. 5A to 5C, the inspection condition information database 231 is provided with an area for storing inspection condition information transmitted from the inspection terminals, the inspection result information database 232 is provided with an area for storing inspection result information transmitted from the inspection terminals, and the inspection image link information database 233 is provided with an area for storing inspection image links transmitted from the inspection terminals.

FIGS. 6A to 6C are diagrams illustrating an example of the inspection object location information database 234, the map information database 235, and the inspection route information database 236 stored in the server device 20.

As illustrated in FIG. 6A, the inspection object location information database 234 is provided with an area for storing information on sites, facilities, and equipment that are information for identifying the equipment, and location information that is information indicating latitudes and longitudes, and stores the information.

As illustrated in FIG. 6B, the map information database 235 is provided with an area for storing information on sites and facilities that is information for identifying the facilities, and map link information on map image link destinations such as URLs on the communication network N in which map images corresponding to the locations (latitudes and longitudes) of the facilities are stored, and stores the information. The map information database 235 may be provided with an area for storing map images in which map images corresponding to the locations (latitudes and longitudes) of the facilities are stored.

As illustrated in FIG. 6C, the inspection route information database 236 is provided with an area for storing information on sites and facilities that is information for identifying the facilities, and inspection route information on the orders in which pieces of equipment belonging to the facilities are inspected when patrol inspections of the facilities are performed, and stores the information.

Based on an access request from each monitoring terminal 40, the server device 20 can identify inspection image link information, a map image, and a facility inspection route corresponding to an inspection condition, an inspection result, and a facility or equipment.

(Inspection Image Storage Device 30)

The inspection image storage device 30 is a storage device that stores inspection images transmitted from the inspection terminals 10, and includes a volatile memory such as a DRAM and a nonvolatile memory such as a hard disk.

(Monitoring Terminals 40)

Figure 7:
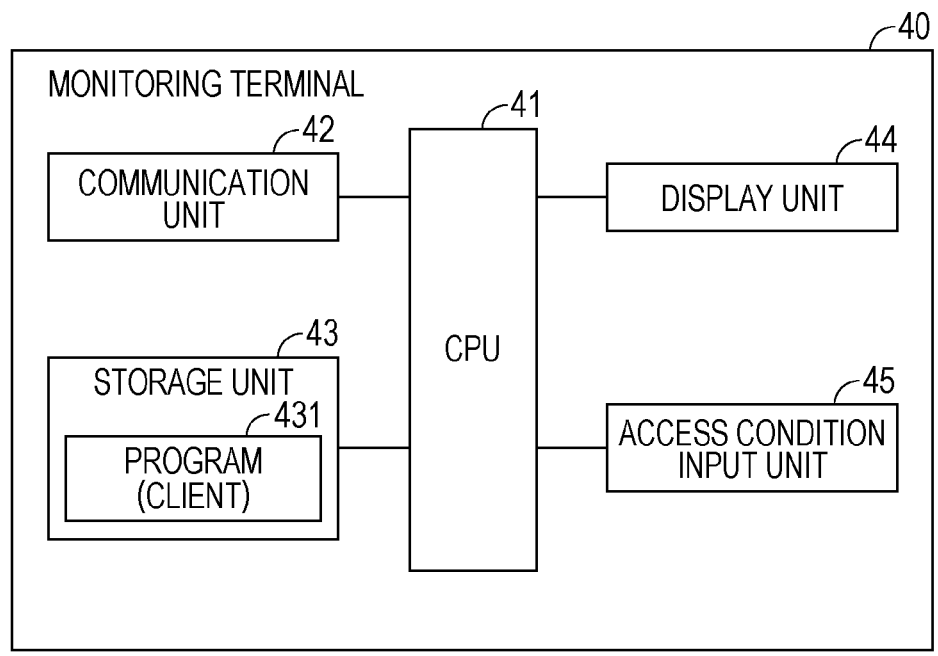
FIG. 7 is a diagram illustrating a configuration of a monitoring terminal according to one or more embodiments.

Next, the monitoring terminals 40 will be described. FIG. 7 is a diagram illustrating a configuration of each monitoring terminal 40. As illustrated in FIG. 7, the monitoring terminal 40 includes a CPU 41, a communication unit 42, a storage unit 43, a display unit 44, and the access condition input unit 45, and is provided as a client computer that executes a program by the CPU 41.

The CPU 41 implements the functions of the monitoring terminal 40 by executing a program 431 stored in the storage unit 43. Specifically, the CPU 41 transmits an access request and access conditions from a manager input from the access condition input unit 45 to the server device 20 or the inspection image storage device 30 via the communication unit 42. The CPU 41 functions as a display image generation unit that generates a display image including information on inspection results and information on links to inspection images acquired from the inspection information database 230 of the server device 20 or the inspection image storage device 30 via the communication unit 42.

The storage unit 43 stores the program 431 etc. necessary for the monitoring terminal 40 to operate, and further has a function as a temporary storage area for temporarily storing the results of calculation by the CPU 41. The storage unit 43 includes a volatile memory such as a DRAM and a non-volatile memory such as a hard disk.

The communication unit 42 transmits and receives information to and from the server device 20 and the inspection image storage device 30.

The display unit 44 is, for example, a liquid crystal panel or the like, and displays a display screen generated by the CPU 41.

The access condition input unit 45 is an input device for an operator of the monitoring terminal 40 to perform input to operate the monitoring terminal 40. For example, it may be provided as input devices such as a keyboard, a mouse, and a trackball, or as a single device that serves as both a display device and an input device, such as a touch panel with a touch sensor disposed on the front surface of the display unit 44.

Figure 8:
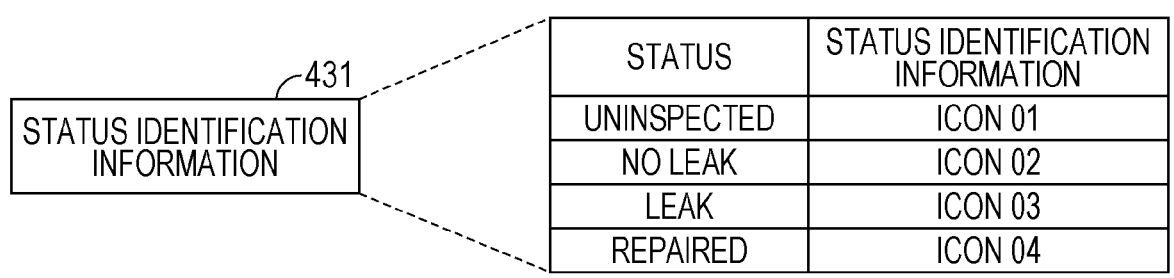
FIG. 8 is a diagram illustrating an example of a status identification information stored in the monitoring terminal according to one or more embodiments.

The following describes information stored in the storage unit 43 with reference to FIG. 8.

FIG. 8 is a diagram illustrating an example of a status identification information database 431 stored in the monitoring terminal. As illustrated in FIG. 8, the status identification information database 431 is provided with an area for storing, for example, information indicating icon images (icons 01 to 04) to be displayed on the display unit 44 according to inspection results (statuses) as status identification information for identifying the results (statuses) of inspections of facilities or equipment, and stores the information.

Icons are displayed on the display unit 44 in accordance with inspection result information corresponding to facilities or equipment which is obtained based on an access request from the monitoring terminal 40.

<Operation of Gas Inspection Management System 1>

Next, the operation of the gas inspection management system 1 will be described with reference to FIGS. 9, 10, and 11.

FIG. 9 is a sequence diagram illustrating an example of the operation of the gas inspection management system 1.

In a gas-leak inspection of a gas facility, an inspector performs gas-leak inspections on a plurality of pieces of equipment included in the facility on a piece-by-piece basis, based on inspection route information provided from the server device 20.

In FIG. 9, steps S1 to S4 are steps in which the inspector performs the gas-leak inspection of the gas facility and uploads information to the server.

First, as illustrated in FIG. 9, the inspection terminal 10 transmits inspection condition information (step S1). Here, of the inspection condition information illustrated in FIG. 3A, for information on the inspector, the site, the facility, and the equipment as the object of inspection, the inspection terminal 10 accepts input of the inspection condition information from the inspector to the operation input unit 16, temporarily stores the information in the inspection information storage unit 13, and then transmits the information to the server device 20 via the communication network N. For information on the inspection ID, the inspection date, the inspection starting time, and the inspection finishing time, information set based on the clock means (not illustrated) or the like included in the inspection terminal 10 is transmitted to the server device 20. The server device 20 stores the transmitted inspection condition information in the inspection condition information database 231.

Next, the inspection terminal 10 acquires and transmits inspection images (step S2). Here, the inspection terminal 10 acquires an infrared video in which the equipment that is the object of inspection is imaged frame by frame sequentially from the imaging means 50, and temporarily stores it in the inspection information storage unit 13. The CPU 11 executes the program 131 related to processing of the optical gas-leak detection method. When there is a region in each frame of the infrared video where frequency components are absorbed by hydrocarbon-based gas, the CPU 11 converts, for example, the amount of the gas in that region into color information, maps the color information to replace original images, and stores them as inspection images in the inspection information storage unit 13. Thereafter, the communication unit 14 transmits the inspection images in which the color information is mapped to the region where gas components have been detected, to the inspection image storage device 30 via the communication network N. The inspection image storage device 30 stores the transmitted inspection images and transmits information on the link destination of the stored inspection images to the inspection terminal 10.

The inspector causes the display unit 15 to display the inspection images in which the color information is mapped to the region where the gas components have been detected, and observes them to evaluate the gas-leak status of the object of inspection, and inputs the result to the operation input unit 16 as the inspection result (status).

Next, the inspection terminal 10 transmits inspection result information and inspection image link information (step S3). Here, of the inspection result information illustrated in FIG. 3B, for information indicating the inspection result (status) of the object of inspection and information on the component in which the inspection result (status) has been confirmed, the inspection terminal 10 accepts input of the inspection result information from the inspector to the operation input unit 16, and transmits the inspection result information via the communication network N when the information is input.

For information on the inspection ID and the equipment that is the object of inspection, the information input in step S1 and stored in the inspection information storage unit 13 is transmitted to the server device 20. For information on the link destination of the inspection images, the information acquired from the inspection image storage device 30 based on step 2 is transmitted to the server device 20. The server device 20 stores the transmitted inspection result information in the inspection result information database 232, and stores the inspection image link information in the inspection image link information database 233.

FIG. 10 is a diagram illustrating an example of the information stored in the server device 20 based on the inspection condition information, the inspection result information, and inspection image transmission transmitted from the inspection terminal. When the inspection condition information and the inspection result information are transmitted from the inspection terminal 10 to the server device 20, the information illustrated in FIG. 10 is stored in the storage unit 23. Inspection images are transmitted to and stored in the inspection image storage device 30.

Next, it is determined whether or not to finish the inspection based on operation input from the inspector to the operation input unit 16 (step S4). When the inspection is continued (when No), the processing returns to step S1, and the processing on the next piece of equipment is performed. When the inspection is finished (when Yes), the processing is finished.

Next, the monitoring terminal 40 makes an access request to the server device 20 (step S5). Specifically, the monitoring terminal 40 accepts input of an access request and access condition information from a manager to the access condition input unit 45, and transmits the information to the server device 20 via the communication network N upon the input. At this time, as the access request, as illustrated in FIG. 11, for example, an access request selected from three types of requests for map display, six types of requests for list display, and one type of request for inspection image reproduction can be selected. The manager further inputs, to the access condition input unit 45, access condition information that conditions the selected access request, for example, an inspection date, an object of inspection, an inspector, an inspection result (status), etc.

Next, the server device 20 searches for inspection information based on the access request and the access condition information (step S6), and transmits the obtained information to the monitoring terminal.

FIG. 11 is a diagram illustrating an example of the information transmitted from the server device 20 to the monitoring terminal 40, based on the access request and the access condition information transmitted from the monitoring terminal. The server device 20 searches the inspection condition information database 231, the inspection result information database 232, the inspection image link information database 233, the inspection object location information database 234, the map information database 235, and the inspection route information database 236 for necessary information based on the access request and the access condition information, and transmits the obtained information to the monitoring terminal 40. Specific processing in step S6 according to the access request will be described later.

Next, the monitoring terminal 40 generates a display image based on the information obtained from the server device 20, and displays it on the display unit 44 (step S7). A specific processing mode in step S7 according to the access request will be described later.

Next, the monitoring terminal 40 requests inspection images (step S8). Specifically, the monitoring terminal 40 accepts specification of inspection image link information displayed on the display unit 44 as the display image from the manager to the access condition input unit 45, and transmits the inspection image link information to the inspection image storage device 30 via the communication network N upon the specification input. The inspection image storage device 30 transmits inspection images stored in a link destination indicated by the transmitted inspection image link information to the monitoring terminal 40. A specific processing mode in step S8 according to the access request will be described later.

Next, the monitoring terminal 40 displays obtained inspection images on the display unit 44 (step S9). The manager can check the gas-leak status of the object of inspection by observing the inspection images of the infrared video displayed on the display unit 44, in which color information is mapped to a region where gas components have been detected.

<Operation in Steps S6 and S7 According to Access Request>

The following describes the operation of the server device 20 in step S6 in FIG. 9 according to the access request, and the operation of the monitoring terminal 40 in step S7.

(Process to Display Facilities' Latest Statuses on Map)

The following describes the operation of the server device 20 in step S6 in FIG. 9 when the access request in step S5 is the map display of facilities' latest statuses.

Figure 12A:
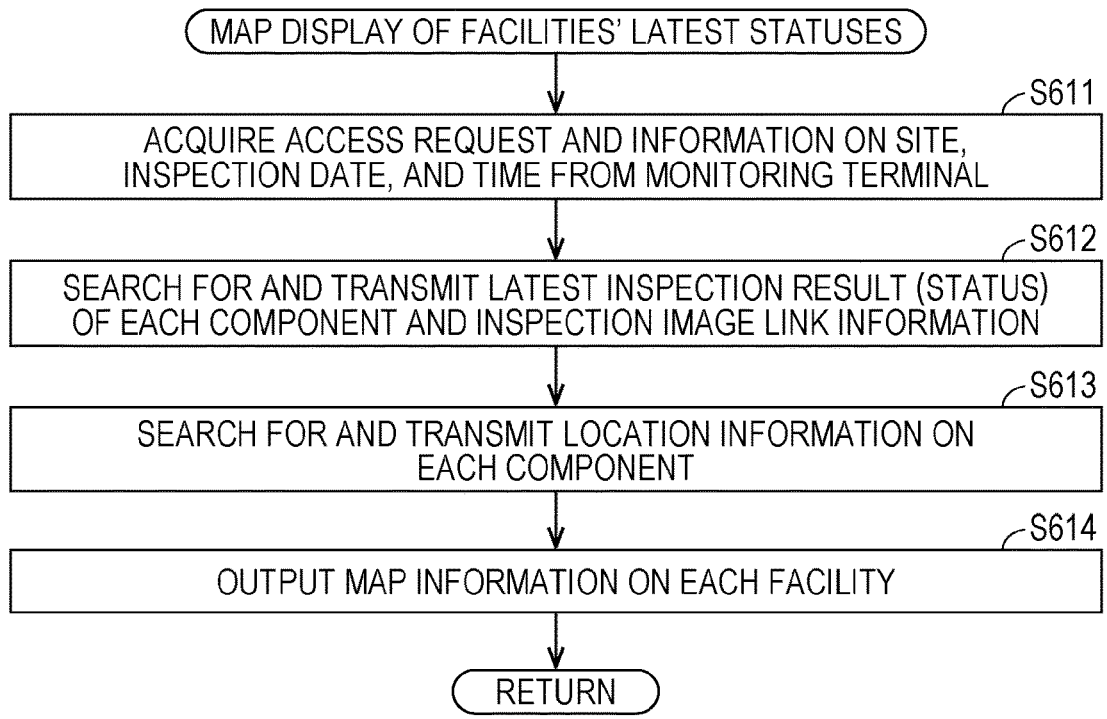
FIG. 12A is a flowchart illustrating a process performed by the server device (step S6 in FIG. 9) in a process to display the latest statuses of facilities on a map.

FIG. 12A is a flowchart illustrating a process performed by the server device 20 (step S6 in FIG. 9).

First, the server device 20 acquires the access request and information on a site, an inspection date, and time from the monitoring terminal 40 (step S611).

Next, the server device 20 searches for and transmits the latest inspection result (status) of each component and the inspection image link information (step S612). Specifically, for each component belonging to the specified site, the server device 20 searches the inspection condition information database 231 and the inspection result information database 232 for information on the latest inspection result (status) based on the inspection date and the time, and searches the inspection image link information database 233 for the inspection image link information. Then, the server device 20 transmits information on facilities and the components belonging to the site, information on the components' latest inspection results (statuses), and the inspection image link information to the monitoring terminal 40.

Next, the server device 20 searches the inspection object location information database 234 for location information on each component, and transmits it to the monitoring terminal 40 (step S613).

Next, the server device 20 searches the map information database 235 for map link information on the link destination of a map image of each facility, transmits it to the monitoring terminal 40 (step S614), and finishes the process.

Figure 12B:
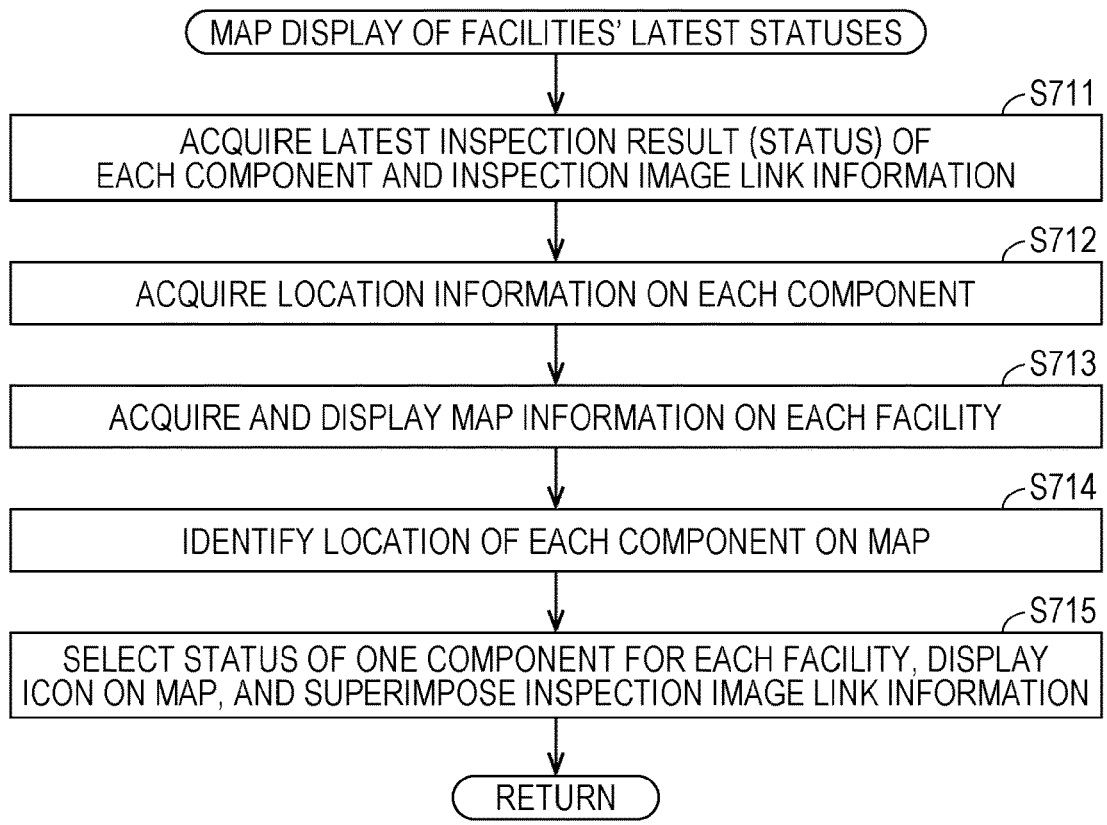
FIG. 12B is a flowchart illustrating a process performed by the monitoring terminal (step S7 in FIG. 9) in a process to display the latest statuses of facilities on a map.

Next, the operation of the monitoring terminal 40 in step S7 in FIG. 9 will be described. FIG. 12B is a flowchart illustrating a process performed by the monitoring terminal 40 (step S7 in FIG. 9).

First, the monitoring terminal 40 acquires the latest inspection result (status) of each component and the inspection image link information from the server device 20 (step S711). The monitoring terminal 40 acquires the location information on each component (step S712). Next, the monitoring terminal 40 acquires the map link information on the link destination of the map image of each facility from the server device 20, acquires the map image from the link destination, and displays it on the display unit 44 (step S713).

Next, the monitoring terminal 40 identifies the location of each component on the map (step S714), displays the status of one component at each facility with an icon, and superimposes the inspection image link information thereon. At this time, if the inspection results (statuses) of a plurality of components included in the facility are different, an inspection result (status) is selected based on the priority order of "leak" and "no leak". Then, as status identification information corresponding to the selected inspection result (status), an icon image is selected from the status identification information database 431 and is displayed as the inspection result (status) of the facility. In addition, the inspection image link information corresponding to the selected inspection result (status) is superimposed on the icon image.

Figure 13:
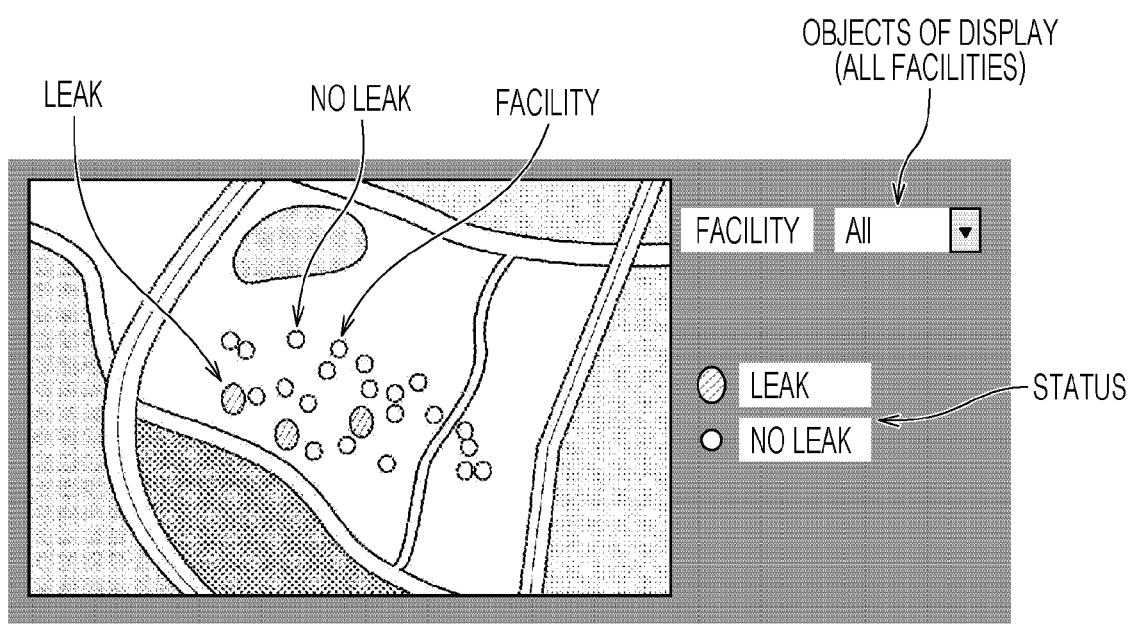
FIG. 13 is an example of an image displayed on the monitoring terminal according to one or more embodiments by the process to display the latest statuses of facilities on a map.

FIG. 13 is an example of an image displayed on the monitoring terminal. As illustrated in FIG. 13, for every facility, an icon image identifiably indicating an inspection result (status) is displayed at the location of a component detected as the inspection result (status) on a map. In the display example illustrated in FIG. 13, the location of each component is displayed approximately at the location of a facility to which the component belongs.

That is, by displaying information on the results of inspections of objects of inspection in association with inspection images, it is possible to display the statuses of gas-leak occurrence and restoration in gas facilities as the objects of inspection in an easy-to-understand manner. As a result, the manager of gas facilities can accurately grasp the gas-leak statuses of the gas facilities.

Further, by displaying information on the results of inspections of objects of inspection on a map, a manager can find at a glance the results of inspections of facilities or equipment in a map form. Thus, the manager of gas facilities can accurately grasp the distribution of facilities in which gas leaks have occurred, and can effectively use it for efficient planning of reinspection and restoration.

Here, objects of inspection include a plurality of higher-level inspection objects and a plurality of lower-level inspection objects included in each higher-level inspection object. For example, to a higher-level inspection object site, facilities are lower-level inspection objects. To a higher-level inspection object facility, pieces of equipment are lower-level inspection objects. To a piece of higher-level inspection object equipment, components are lower-level inspection objects. The result of an inspection of a higher-level inspection object may include the result of an inspection of each of a plurality of lower-level inspection objects. When the result of the inspection of at least one lower-level inspection object included in the higher-level inspection object is a "leak" inspection result, a display image to display the "leak" inspection result of the lower-level inspection object as the result of the inspection of the higher-level inspection object may be generated. That is, the result of the inspection of the higher-level inspection object may be identified as a "leak" inspection result.

With this configuration, based on the criterion that at least one lower-level inspection object included in a higher-level inspection object has a "leak" inspection result, the manager can easily grasp the inspection result status of a higher-level inspection object including a plurality of lower-level inspection objects with speed and accuracy, and ensure the safety of the objects of inspection.

[Mode to Display Inspection Starting and Finishing Times and Inspection Route]

As an example of a display mode, inspection starting and finishing times of facilities and an inspection route in a site may be displayed.

Figure 14A:
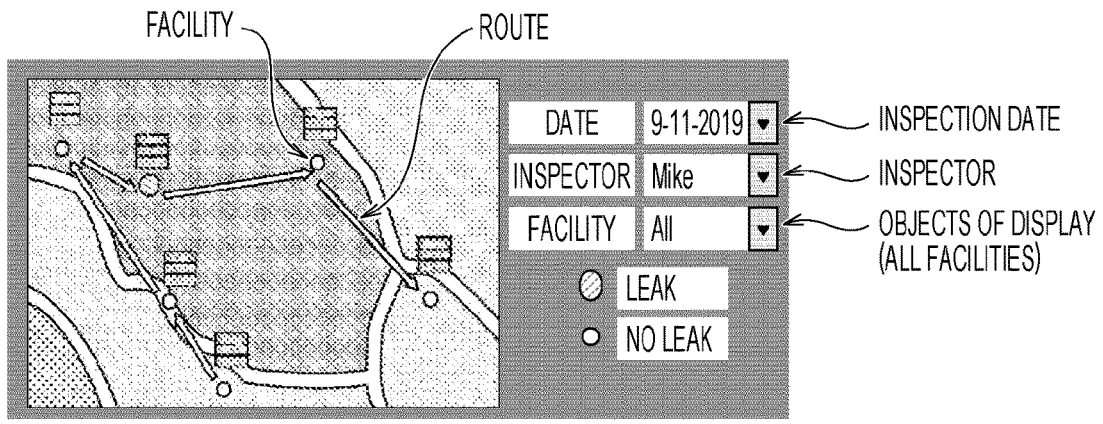
FIG. 14A is another example of an image displayed on the monitoring terminal according to one or more embodiments by a process to display a history of inspections of all facilities on a map.

FIG. 14A is another example of an image displayed on the monitoring terminal by a process to display an abnormal facility inspection history on a map. For an abnormal facility, an icon image is displayed at the location of a component detected as an inspection result (status) on a map as status identification information that identifiably indicates the inspection result (status). Here, the location of the component is also displayed approximately at the location of the facility to which the component belongs. The monitoring terminal 40 acquires information on the inspection starting time and the inspection finishing time from the server device 20. As illustrated in FIG. 14A, the inspection starting time and the inspection finishing time are displayed in script in the vicinity of the abnormal facility with the inspection result (status) indicating "leak". The monitoring terminal 40 may acquire information on an inspection route in a site from the server device 20 and display the inspection route together with the icon indicating the abnormal facility.

As another example of a display mode, the inspection starting and finishing times of equipment and an inspection route in a facility may be displayed.

Figure 14B:
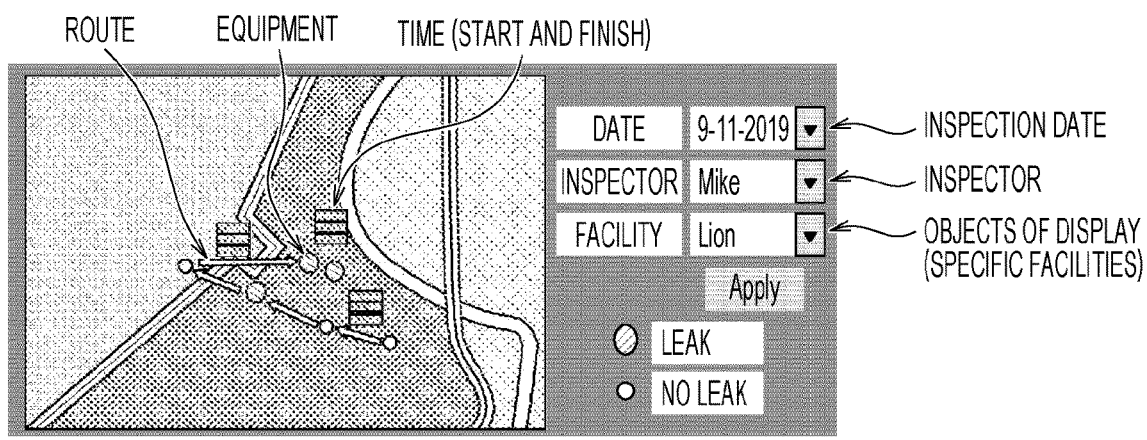
FIG. 14B is another example of an image displayed on the monitoring terminal according to one or more embodiments by a process to display the latest status of a specific facility on a map.

FIG. 14B is another example of an image displayed on the monitoring terminal by a process to display the latest status of a specific facility on a map. For the selected specific facility, icon images identifiably indicating inspection results (statuses) are displayed at the locations of pieces of equipment detected as the inspection results (statuses) on a map. In the display example illustrated in FIG. 14, the locations of the pieces of equipment belonging to the facility are displayed so that the locations of the pieces of equipment can be identified. The monitoring terminal 40 may acquire information on the inspection starting times and the inspection finishing times from the server device 20, and as illustrated in FIG. 14B, the inspection starting times and the inspection finishing times may be displayed in script in the vicinity of the pieces of equipment with the inspection results (statuses) indicating "leak". The monitoring terminal 40 may acquire information on an equipment inspection route from the server device 20 and display the inspection route together with the icons indicating the pieces of equipment.

An inspection history map on which information on an inspection route is displayed on the map allows the manager to find at a glance the inspection starting times and finishing times of facilities, and a history of patrol of the facilities or pieces of equipment in a map form. Thus, the inspection history map can be effectively used for efficient inspection planning.

[Mode to Display Inspection Images by Specification]

Figure 14C:
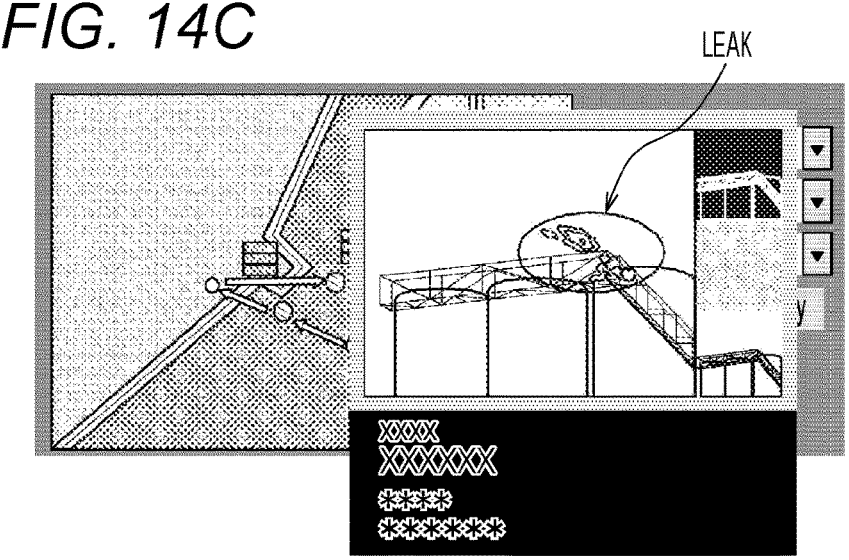
FIG. 14C is an example illustrating an inspection image displayed on the monitoring terminal according to one or more embodiments when an icon of a component indicating "leak" displayed on the map is specified.

FIG. 14C is an example illustrating an inspection image displayed on the monitoring terminal when an icon of a piece of abnormal equipment or an abnormal facility to which a piece of abnormal equipment belongs indicating "leak" displayed on a map is specified. An inspection image obtained from an inspection image link destination is displayed on the display unit 44, based on the specification of inspection image link information displayed together with the icon of the piece of abnormal equipment (or the abnormal facility).

The process to display the latest status of a facility linked to inspection images on a map allows the manager to easily check inspection images on which an inspection result (status) indicated by an icon of a component has been based. Thus, the manager of the gas facilities can efficiently evaluate and verify the reliability of the results of inspections by the inspector.

(Process to Display Abnormal Facilities on Map)

The following describes the operation of the server device 20 in step S6 in FIG. 9 when the access request in step S5 is the map display of abnormal facilities.

Figure 15A:
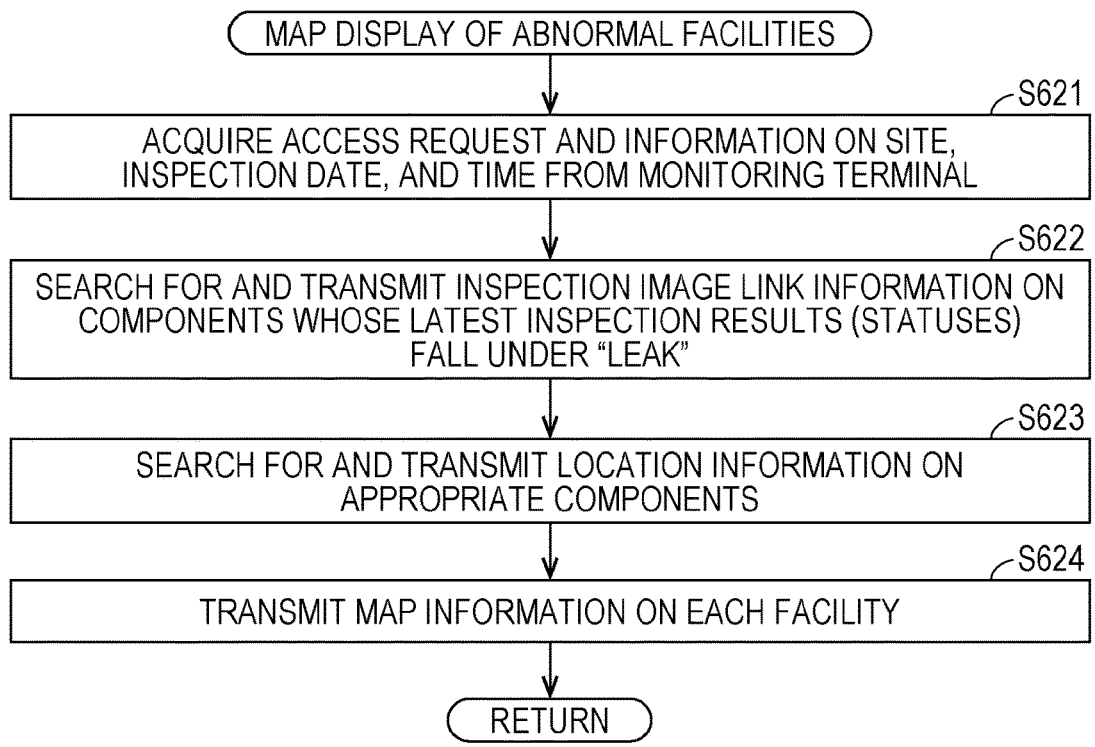
FIG. 15A is a flowchart illustrating a process performed by the server device (step S6 in FIG. 9) in a process to display abnormal facilities on a map.

FIG. 15A is a flowchart illustrating a process performed by the server device 20 (step S6 in FIG. 9).

First, the server device 20 acquires an access request and site, date, and time information as access conditions from the monitoring terminal 40 (step S621).

Next, the server device 20 searches for and transmits components whose latest inspection results (statuses) fall under "leak", and inspection image link information (step S622). Specifically, for each component belonging to the specified site, the server device 20 searches the inspection condition information database 231 and the inspection result information database 232 for information on the latest inspection result (status), and searches the inspection image link information database 233 for inspection image link information. Then, the server device 20 selects information on components on which information on the latest inspection results (statuses) of the components fall under "leak", and for the selected components, transmits information on the site, the facilities, and the components and the inspection image link information to the monitoring terminal 40.

Next, the server device 20 transmits location information on the selected components to the monitoring terminal 40 (step S623).

Next, the server device 20 transmits map link information on the link destinations of map images of each facility to the monitoring terminal 40 (step S624), and finishes the process.

Figure 15B:
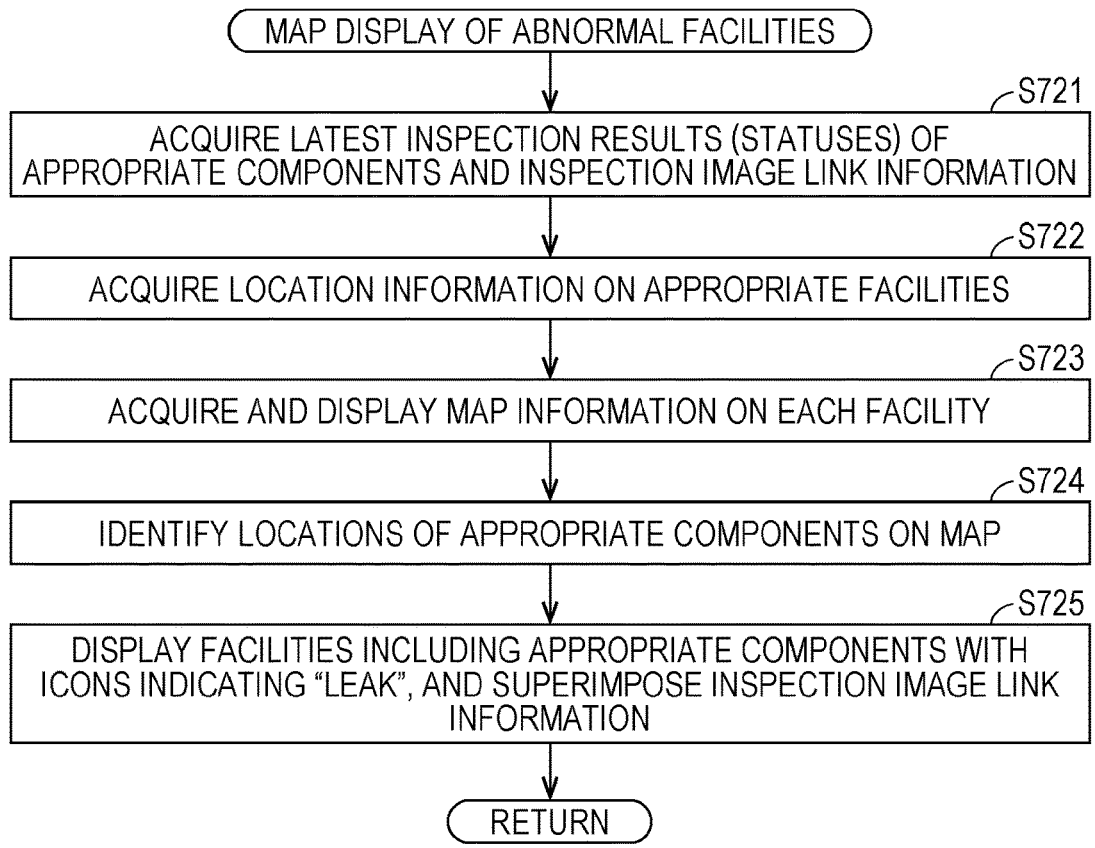
FIG. 15B is a flowchart illustrating a process performed by the monitoring terminal (step S7 in FIG. 9) in a process to display abnormal facilities on a map.

Next, the operation of the monitoring terminal 40 in step S7 in FIG. 9 will be described. FIG. 15B is a flowchart illustrating a process performed by the monitoring terminal 40 (step S7 in FIG. 9).

First, the monitoring terminal 40 acquires the latest inspection results (statuses) on the appropriate components, the inspection image link information (step S721), and the location information on the appropriate components (step S722) from the server device 20. Next, the monitoring terminal 40 acquires the map link information on the link destination of the map image of each facility from the server device 20, acquires the map image, and displays it on the display unit 44 (step S723).

Next, the monitoring terminal 40 identifies the locations of the appropriate components on the map (step S724), displays the abnormal facilities including the appropriate components with icon images as status identification information indicating that the inspection results (statuses) are "leak", and superimposes the inspection image link information corresponding to the selected inspection results (statuses) on the icon images.

Figures 16A, 16B:
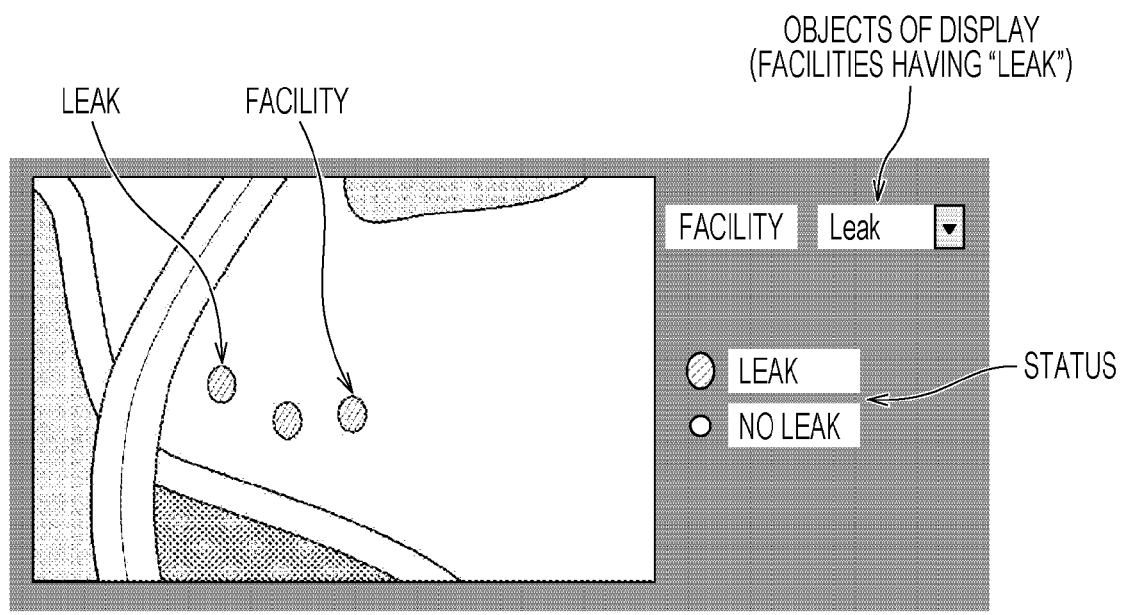
FIG. 16A is an example of an image displayed on the monitoring terminal according to one or more embodiments by the process to display abnormal facilities on a map.
FIG. 16B is an example of a display mode showing multiple inspection images displayed on the monitoring terminal according to one or more embodiments when multiple icons corresponding to multiple abnormal facilities displayed on a map are specified.

FIG. 16A is an example of an image displayed on the monitoring terminal. As illustrated in FIG. 16A, for every facility, an icon image identifiably indicating the inspection result (status) is displayed at the location of a component whose inspection result (status) is detected as "leak" on a map. In the display example illustrated in FIG. 16A, all facilities belonging to a site are also objects of display, and thus the locations of the appropriate components are displayed approximately at the locations of the abnormal facilities to which the appropriate components belong.

FIG. 16B is an example illustrating a display mode of inspection images displayed on the display unit 44 when icons of multiple components indicating "leak" displayed on a map are specified. Based on the specification of the inspection image link information displayed together with the icons of the multiple components, inspection images for the multiple components obtained from the inspection image link destinations are listed in a matrix on the display unit 44. When one of the listed inspection images is specified, the inspection image can be displayed and checked for the specified component. In the list display, still images may be displayed. When one of the still images is specified, moving images may be reproduced. Further, on the list display, inspection dates, facilities, and the presence or absence of gas leaks may be displayed. On the list display, "no leak" inspection images may be displayed in addition to "leak" inspection images.

The process to display abnormal facilities on a map allows the manager to easily check the outline of multiple inspection images on which inspection results (statuses) indicated by icons have been based for multiple appropriate components.

(Process to Display Abnormal Facilities on List)

The following describes the operation of the server device 20 in step S6 in FIG. 9 when the access request in step S5 is the list display of abnormal facilities.

Figure 17A:
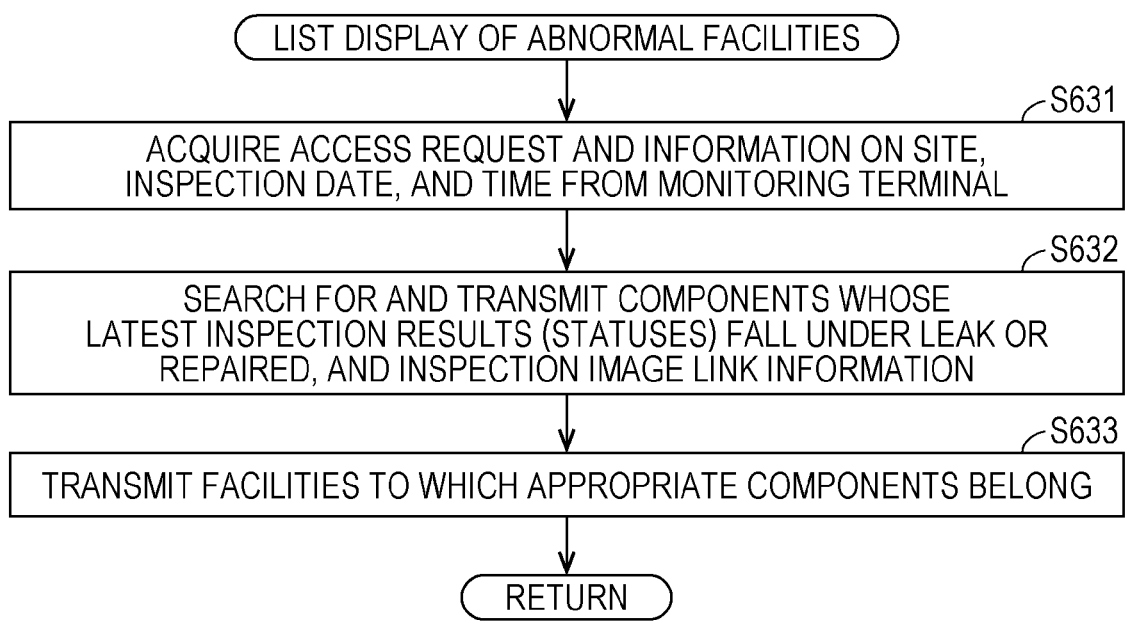
FIG. 17A is a flowchart illustrating a process performed by the server device (step S6 in FIG. 9) in a process to display abnormal facilities on a list.

FIG. 17A is a flowchart illustrating a process performed by the server device 20 (step S6 in FIG. 9).

First, the server device 20 acquires the access request and site, date, and time information as access conditions from the monitoring terminal 40 (step S631).

Next, the server device 20 searches for and transmits components whose latest inspection results (statuses) fall under "leak" or "repaired", and inspection image link information (step S632), and transmits information on facilities to which the selected components belong to the monitoring terminal 40 (step S633).

Figure 17B:
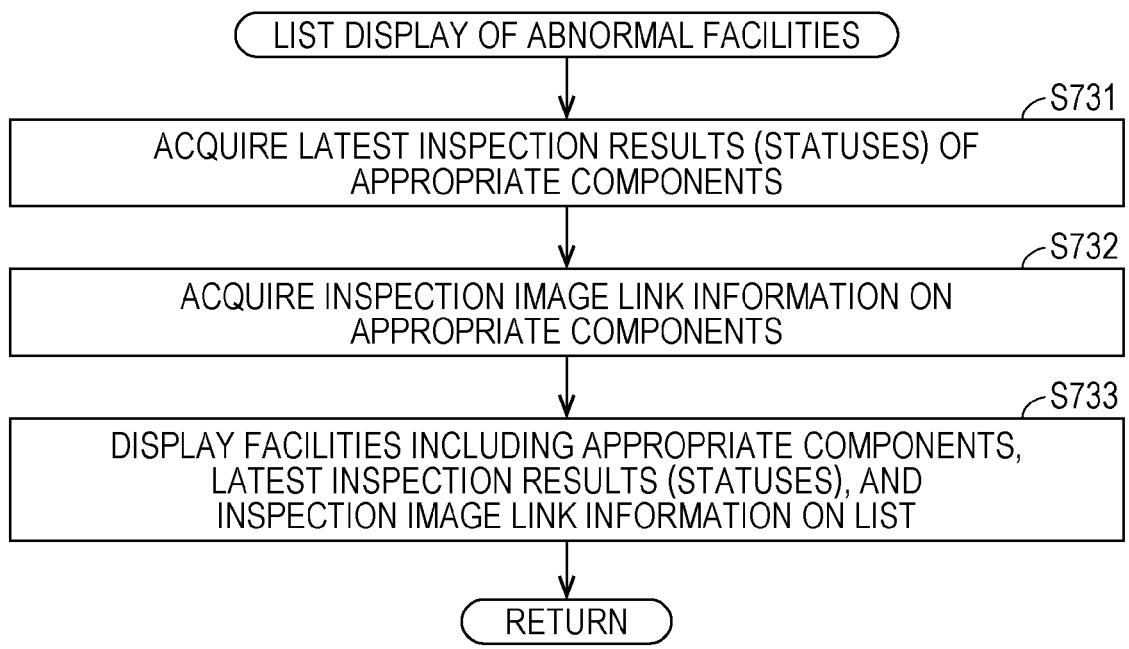
FIG. 17B is a flowchart illustrating a process performed by the monitoring terminal (step S7 in FIG. 9) in a process to display abnormal facilities on a list.

Next, the operation of the monitoring terminal 40 in step S7 in FIG. 9 will be described. FIG. 17B is a flowchart illustrating a process performed by the monitoring terminal 40 (step S7 in FIG. 9).

First, the monitoring terminal 40 acquires, from the server device 20, the latest inspection results (statuses) of the appropriate components (step S731) and the inspection image link information (step S732). Next, the monitoring terminal 40 generates a display image in which the facilities including the appropriate components, the latest inspection results (statuses), and the inspection image link information are displayed on a list, and displays it on the display unit 44 (step S732).

FIG. 18 is an example of an image displayed on the monitoring terminal by the process to display abnormal facilities on a list. As illustrated in FIG. 18, for facilities including appropriate components, inspection dates, conditions corresponding to "leak" or "repaired" that are inspection results (statuses), and symbols associated with inspection image link information corresponding to the inspection results (statuses) are displayed on a list. Based on the specification of a piece of the displayed inspection image link information, inspection images of the component obtained from the inspection image link destination are displayed.

The process to display abnormal facilities on a list allows the manager to easily display and check inspection images on which inspection results (statuses) indicated by symbols displayed on a list have been based, for abnormal facilities to which multiple appropriate components belong easily.

(Process to Display Leakage Rates of All Facilities on List)

Figure 19A:
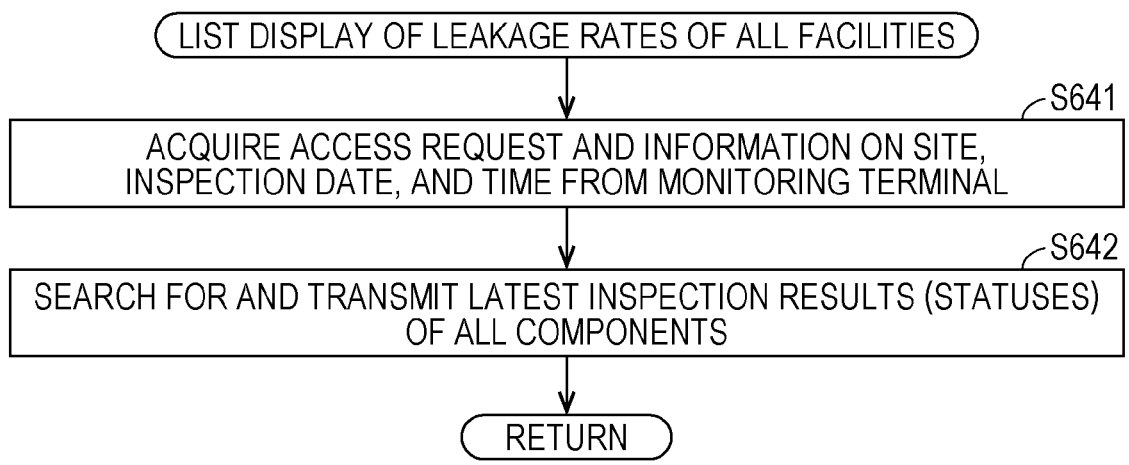
FIG. 19A is a flowchart illustrating a process performed by the server device (step S6 in FIG. 9) in a process to display the leakage rates of facilities on a list.

The following describes the operation of the server device 20 in step S6 in FIG. 9 when the access request in step S5 is the list display of the leakage rates of all facilities FIG. 19A is a flowchart illustrating a process performed by the server device 20 (step S6 in FIG. 9).

First, the server device 20 acquires the access request and site, inspection date, and time information as access conditions from the monitoring terminal 40 (step S641).

Next, the server device 20 searches for the latest inspection results (statuses) of all components and transmits them to the monitoring terminal 40 (step S642).

Figure 19B:
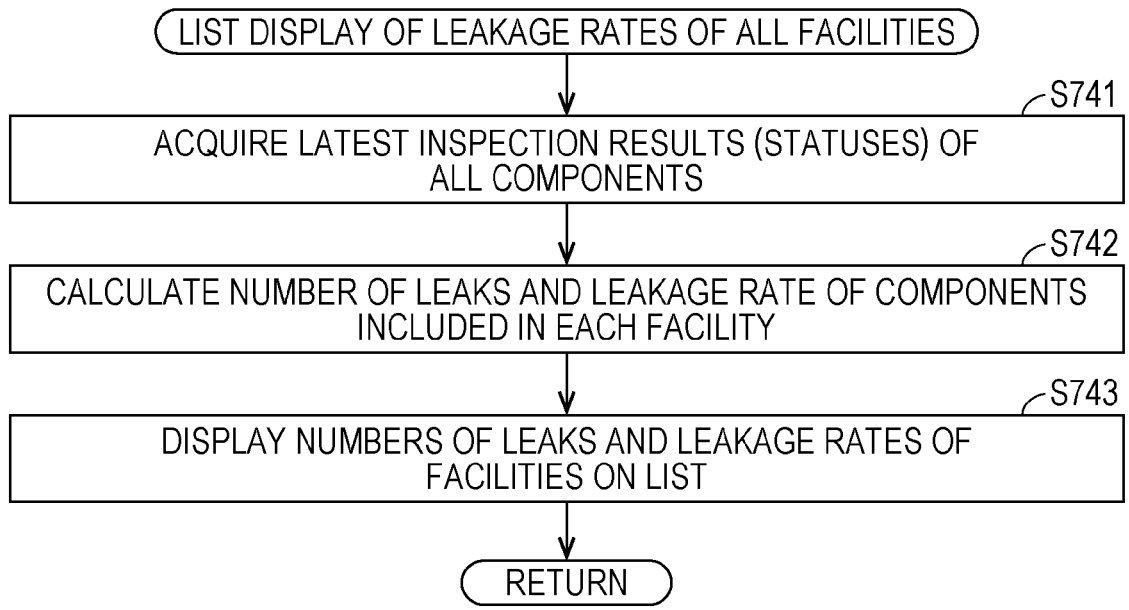
FIG. 19B is a flowchart illustrating a process performed by the monitoring terminal (step S7 in FIG. 9 in a process to display the leakage rates of facilities on a list.

Next, the operation of the monitoring terminal 40 in step S7 in FIG. 9 will be described. FIG. 19B is a flowchart illustrating a process performed by the monitoring terminal 40 (step S7 in FIG. 9).

Here, the monitoring terminal 40 acquires the latest inspection results (statuses) of all the components from the server device 20 (step S741), calculates the number of leaks and the leakage rate of components included in each facility (step S742), generates a display image in which the numbers of leaks and the leakage rates of the facilities are listed, and displays it on the display unit 44 (step S743).

FIG. 20 is an example of an image displayed on the monitoring terminal by the process to display the leakage rates of all facilities on a list. As illustrated in FIG. 20, with all facilities as objects of display, leakage rates in the latest inspection results (statuses) of components included are displayed on a list to display a gas-leak occurrence status in each facility.

The process to display all facilities on a list in descending order of leakage rates allows the manager to easily grasp the latest inspection results (statuses) of the facilities macroscopically, and to quickly and accurately grasp facilities requiring repair.

(Process to Display Inspection History of Specific Facility on List)

Figure 21A:
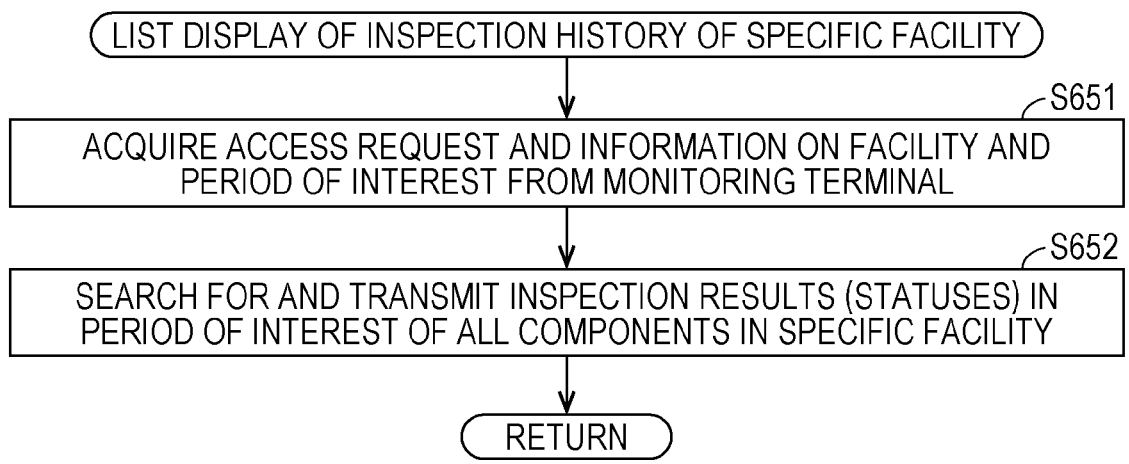
FIG. 21A is a flowchart illustrating a process performed by the server device (step S6 in FIG. 9) in a process to display an inspection history of a specific facility on a list.

The following describes the operation of the server device 20 in step S6 in FIG. 9 when the access request in step S5 is the list display of a facility inspection history. FIG. 21A is a flowchart illustrating a process performed by the server device 20 (step S6 in FIG. 9).

First, the server device 20 acquires the access request and information on a facility and a period of interest as access conditions from the monitoring terminal 40 (step S651).

Next, the server device 20 searches for the latest inspection results (statuses) in the period of interest of all components in the specified specific facility, and transmits them to the monitoring terminal 40 (step S652).

Figure 21B:
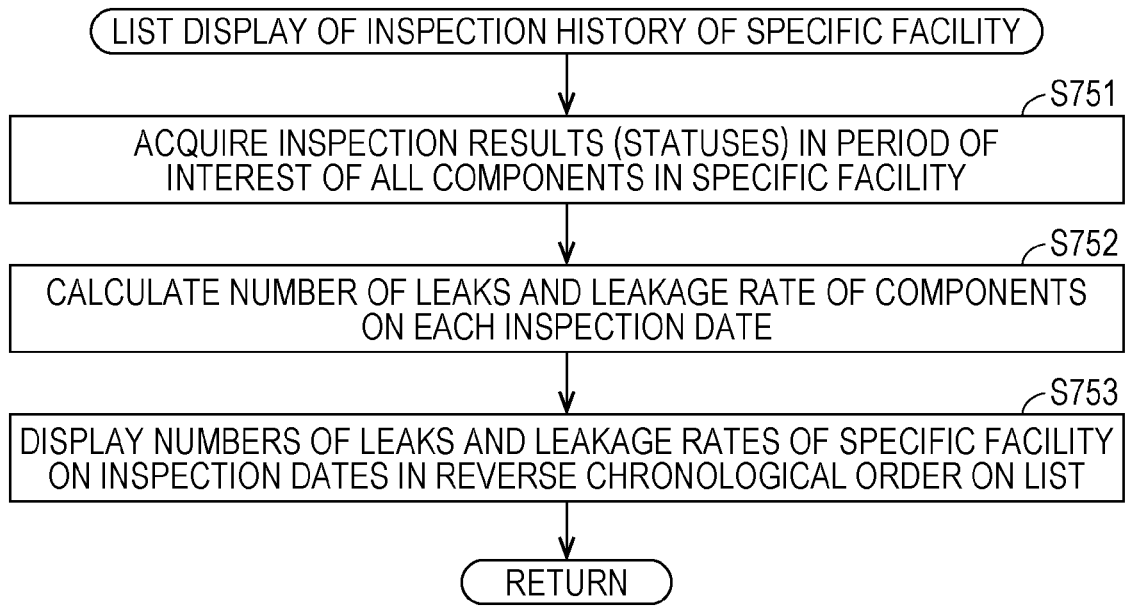
FIG. 21B is a flowchart illustrating a process performed by the monitoring terminal (step S7 in FIG. 9) in a process to display an inspection history of a specific facility on a list.

Next, the operation of the monitoring terminal 40 in step S7 in FIG. 9 will be described. FIG. 21B is a flowchart illustrating a process performed by the monitoring terminal 40 (step S7 in FIG. 9).

Here, the monitoring terminal 40 acquires the latest inspection results (statuses) in the period of interest of all the components in the specific facility from the server device 20 (step S751), calculates the number of leaks and the leakage rate of the components included on each inspection date (step S752), generates a display image in which the numbers of leaks and the leakage rates of the specific facility on the inspection dates are listed in reverse chronological order, and displays it on the display unit 44 (step S753).

FIG. 22 is an example of an image displayed on the monitoring terminal by the process to display an inspection history of a specific facility on a list. As illustrated in FIG.

22, with a specified specific facility as an object of display, leakage rates in the latest inspection results (statuses) of components included in a period of interest are displayed on a list to display the gas-leak occurrence status of the facility on each inspection date.

The process to display an inspection history of a specific facility on a list allows the manager to easily grasp a history of the inspection results (statuses) of the specified specific facility, and to quickly and accurately grasp changes in the status of the facility.

(Process to Display Equipment's Abnormality Rates on List in Descending Order)

The following describes the operation of the server device 20 in step S6 in FIG. 9 when the access request in step S5 is the list display of the abnormality rates of pieces of equipment.

Figure 23A:
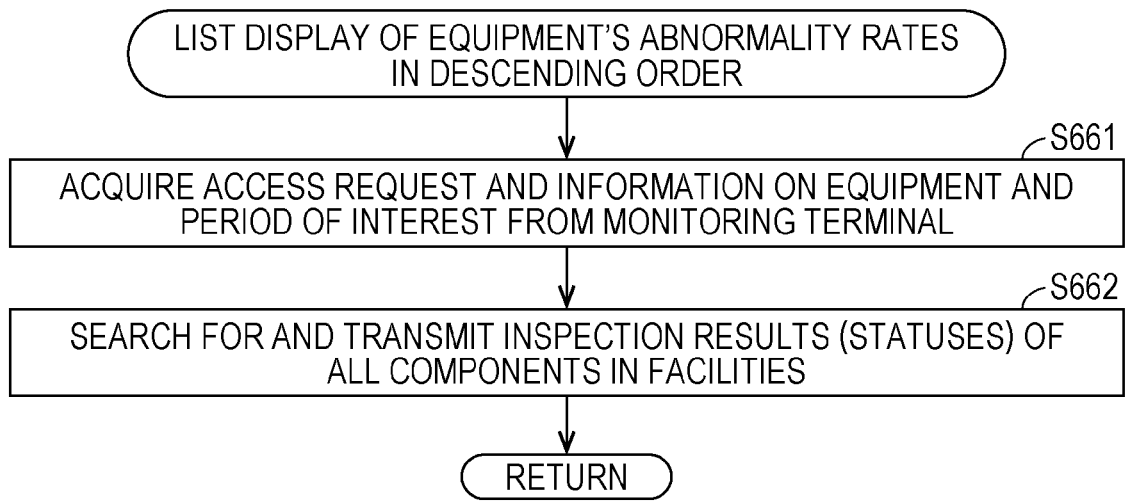
FIG. 23A is a flowchart illustrating a process performed by the server device (step S6 in FIG. 9) in a process to display the abnormality rates of pieces of equipment on a list.

FIG. 23A is a flowchart illustrating a process performed by the server device 20 (step S6 in FIG. 9).

First, the server device 20 acquires the access request and information on a period of interest as an access condition from the monitoring terminal 40 (step S661).

Next, the server device 20 searches for the latest inspection results (statuses) of all pieces of equipment in the period of interest, and transmits them to the monitoring terminal 40 (step S662).

Figure 23B:
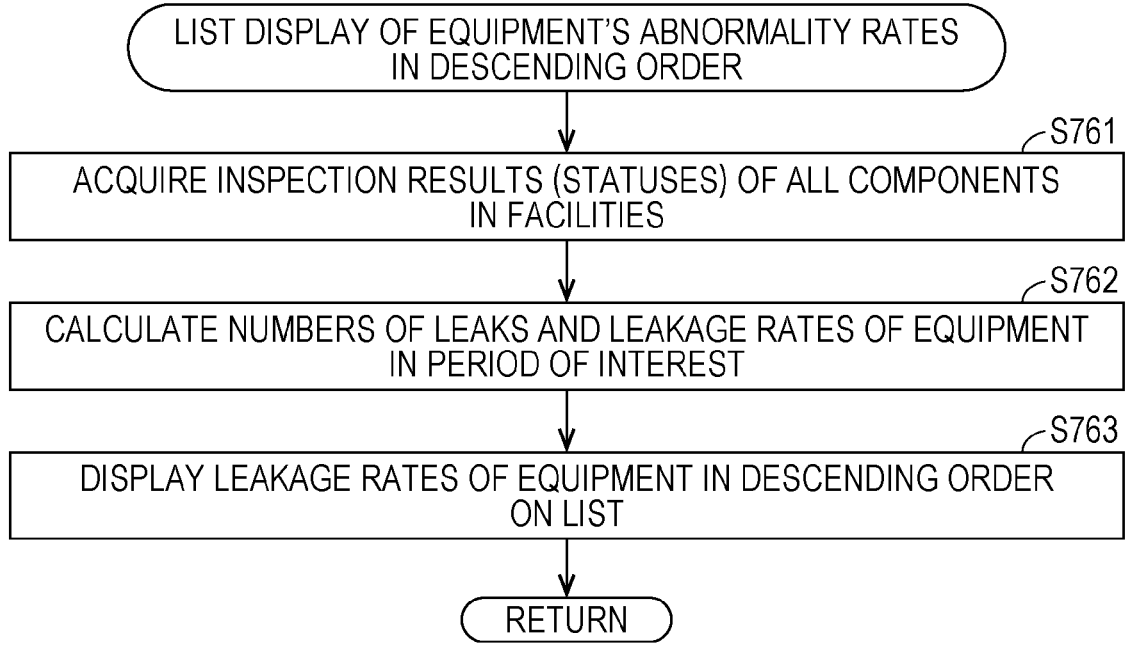
FIG. 23B is a flowchart illustrating a process performed by the monitoring terminal (step S7 in FIG. 9) in a process to display the abnormality rates of pieces of equipment on a list.

Next, the operation of the monitoring terminal 40 in step S7 in FIG. 9 will be described. FIG. 23B is a flowchart illustrating a process performed by the monitoring terminal 40 (step S7 in FIG. 9).

Here, the monitoring terminal 40 acquires the latest inspection results (statuses) of all the pieces of equipment in the period of interest from the server device 20 (step S761), calculates the numbers of leaks and leakage rates in the period of interest (step S762), generates a display image in which the respective numbers of leaks and the respective leakage rates (abnormality rates) of the pieces of equipment are listed in descending order, and displays it on the display unit 44 (step S763).

FIG. 24 is an example of an image displayed on the monitoring terminal by the process to display the abnormality rates of pieces of equipment in descending order on a list. As illustrated in FIG. 22, with all pieces of equipment as objects of display, the leakage rates of the pieces of equipment in a period of interest are displayed in descending order on a list, to display the gas-leak occurrence statuses of the pieces of equipment in the period of interest. Facilities to which the pieces of equipment belong may be displayed at the same time.

The process to display the abnormality rates of pieces of equipment in descending order on a list allows the manager to easily grasp the statuses of the pieces of equipment in a period of interest, and to quickly and accurately grasp pieces of equipment requiring repair and their priorities.

(Process to Display Abnormality Rates in Specific Equipment in Descending Order on List)

The following describes the operation of the server device 20 in step S6 in FIG. 9 when the access request in step S5 is the list display of abnormality rates in a specific piece of equipment. The process may be started, for example, when the manager specifies a specific numerical value shown in a frequency column in the list on the displayed list illustrated in FIG. 24.

Figure 25A:
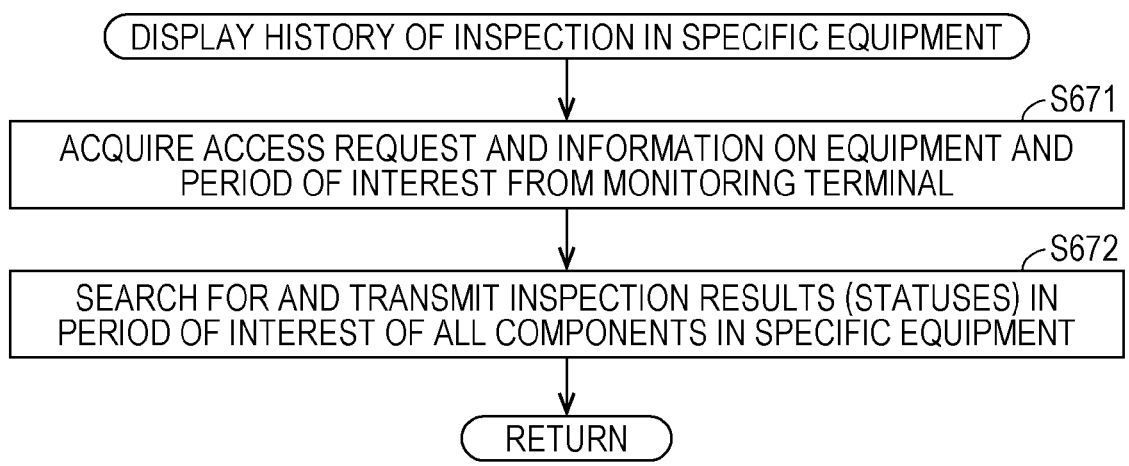
FIG. 25A is a flowchart illustrating a process performed by the server device (step S6 in FIG. 9) in a process to display a history of inspections in a piece of equipment.

FIG. 25A is a flowchart illustrating a process performed by the server device 20 (step S6 in FIG. 9).

First, the server device 20 acquires the access request and information on a period of interest and a piece of equipment as access conditions from the monitoring terminal 40 (step S671).

Next, the server device 20 searches for inspection results (statuses) of the specified specific piece of equipment in the period of interest, and transmits them to the monitoring terminal 40 (step S672).

Figure 25B:
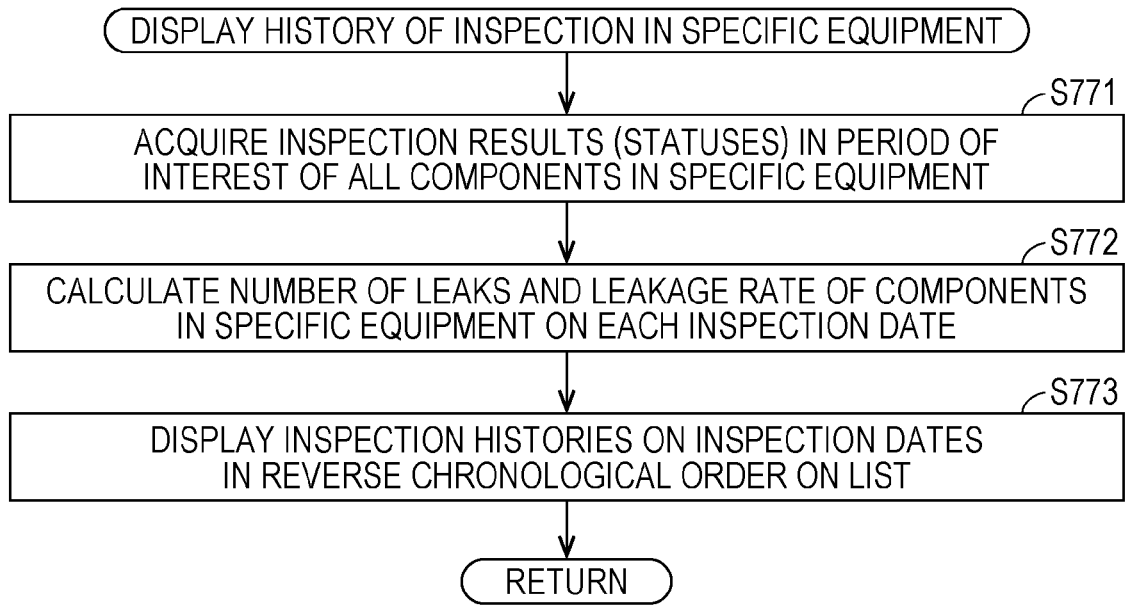
FIG. 25B is a flowchart illustrating a process performed by the monitoring terminal (step S7 in FIG. 9) in a process to display a history of inspections in a piece of equipment.

Next, the operation of the monitoring terminal 40 in step S7 in FIG. 9 will be described. FIG. 25B is a flowchart illustrating a process performed by the monitoring terminal 40 (step S7 in FIG. 9). As illustrated in the figure, the monitoring terminal 40 acquires the inspection results (statuses) of the specific piece of equipment in the period of interest from the server device 20 (step S771), calculates the number of leaks and the leakage rate of the specific piece of equipment on each inspection date (step S772), generates a display image in which the numbers of leaks and the leakage rates (abnormality rates) on the inspection dates are listed in descending order, and displays it on the display unit 44 (step S773).

FIG. 26 is an example of an image displayed on the monitoring terminal by the process to display the abnormality rates of a specific piece of equipment in descending order on a list. As illustrated in FIG. 26, with a specific piece of equipment as an object of display, inspection date-by-inspection date leakage rates in a period of interest are displayed in descending order on a list, to display a gas-leak occurrence status on each inspection date in the period of interest. A component in which a gas leak has been confirmed and a facility to which the component belongs may be displayed on each inspection date at the same time. An inspection starting time and finishing time on each inspection date may be displayed at the same time. The manager can check the relationship between the inspection result (status) of the specific equipment and the inspection time.

The process to display the abnormality rates of a specific piece of equipment in descending order on a list allows the manager to easily grasp changes in the status of the piece of equipment in a period of interest with speed and accuracy.

BRIEF SUMMARY

As described above, the gas inspection management system 1 according to one or more embodiments includes: the inspection information database 230 that stores inspection results and information on links to inspection images for a plurality of objects of inspection; the access condition input unit 45 that accepts input of an access request and condition specification from a manager; the inspection information acquisition unit (CUP 21) that selects part or all of the plurality of objects of inspection from the inspection information database 230, based on the access request, and acquires information on inspection results and information on links to inspection images for the selected objects of inspection; the display image generation unit (CPU 41) that generates a display image including the information on the inspection results and the information on the links to the inspection images for the selected objects of inspection; and the display unit 44 that displays the display image.

With this configuration, by displaying information on the results of inspections of objects of inspection in association with inspection images, it is possible to display the statuses of gas-leak occurrence and restoration in gas facilities in an easy-to-understand manner. As a result, the manager of the gas facilities can accurately grasp the gas-leak statuses of the gas facilities.

MODIFICATIONS

Although the gas inspection management system 1 according to one or more embodiments has been described above, the present disclosure is not limited by the above embodiments in any way except for its essential characteristic components. For example, the present disclosure also includes modes obtained by applying various modifications conceived by those skilled in the art to the embodiments, and modes achieved by arbitrarily combining components and functions in each embodiment without departing from the gist of the present invention. The following describes, as an example of such modes, modifications of the above embodiments.

(1) In the above embodiments, the gas inspection management system 1 has been described by taking as an example the embodiments in which information on the results of inspections of objects of inspection are associated with inspection images to be displayed on a map or on a list. However, a list display may be followed by a map display. For example, on the display list illustrated in FIG. 20, 22, or 26, the manager may specify a specific date shown in an inspection date column in the list so that an access request for the process to display a history of inspections of facilities on a map is issued from the monitoring terminal 40 to the server device 20, and the inspection history map on the facilities illustrated in FIG. 14A is displayed on the display unit 44 of the monitoring terminal 40, based on the access request. The inspection history map allows the manager to find at a glance the inspection starting times and finishing times of the facilities and a history of patrol of the facilities in a map form. Thus, the inspection history map can be effectively used for efficient inspection planning. The monitoring terminal 40 may acquire information on an inspection route in a site from the server device 20 and display the inspection route together with an icon indicating an abnormal facility.

(2) The above embodiments have been described by illustrating the example in which the display image generated in the monitoring terminal 40 is displayed on the display unit 44 constituting the monitoring terminal 40. However, the display image may be displayed on a display screen of the server device 20, for example.

The above embodiments have been described by illustrating the example in which the program 431 related to display image generation processing is executed by the CPU 41 of the monitoring terminal 40. However, the display image generation processing may be executed by the CPU 21 of the server device 20.

This allows the manager to grasp gas inspection results (statuses) and inspection images on a display screen of the server device 20 or the inspection terminal 10, and allows more effective use of the inspection results.

(3) The above embodiments have been described by illustrating the example in which the program 131 related to the processing of the optical gas-leak detection method is executed by the CPU 11 of the inspection terminal 10. However, the CPU 21 of the server device 20 may execute the processing of the optical gas-leak detection method, based on original images of inspection images stored in the inspection image storage device 30. Inspection images in which color information is mapped to a region where gas components have been detected may be transmitted from the server device 20 to the inspection terminal 10 via the communication network N.

(4) In the gas inspection management system 1 according to the above embodiments, the storage unit 23, which is a storage device, is included in the server device 20, but the storage device is not limited to this. A semiconductor memory, a hard disk drive, an optical disk drive, a magnetic storage device, or the like may be externally connected to the server device 20 via the Internet. Alternatively, the information in the inspection information database 230 stored in the storage unit 23 of the server device 20 may be stored in the inspection image storage device 30.

(5) The above embodiments have been described by illustrating the configuration in which the inspector evaluates and determines the presence or absence of gas leaks in an object of inspection, based on inspection images displayed on the display unit 15 of the inspection terminal 10, and transmits information on the inspection result (status) from the inspection terminal 10 to the server device 20. However, the present disclosure is not limited to this. The manager may cause the display unit 44 of the monitoring terminal 40 to display inspection images to evaluate and determine the presence or absence of gas leaks in an object of inspection, and transmit information on the inspection result (status) from the monitoring terminal 40 to the server device 20. Alternatively, for the information on the inspection result (status) transmitted from the inspection terminal 10 to the server device 20 by the inspector, the manager may cause the display unit 44 of the monitoring terminal 40 to display the inspection images to check them, update the information on the inspection result (status) as necessary, and transmit it from the monitoring terminal 40 to the server device 20. That is, evaluation by the inspector and checking and correction by the manager may be selectively or mutually performed.

(6) In the above embodiments, the inspection results (statuses) of gas facilities are classified into the categories "leak and no leak", and the modes of indicators representing the inspection results (statuses) of the gas facilities vary depending on the categories. However, the inspection results (statuses) may be classified into "leak", "no leak", and "unknown", or into four or more categories, and the modes of indicators indicating the inspection results (statuses) may vary in multiple stages. This allows the inspection results (statuses) to be grasped more accurately.

(7) The above embodiments have been described by illustrating a gas plant as a gas facility as an example of inspection images. However, the present disclosure is not limited to this, and may be applied to the generation of display images of an apparatus, a device, an experimental laboratory, a laboratory, a factory, or a business place that uses gas.

(8) Although the present disclosure has been described based on the above embodiments, the present disclosure is not limited to the above embodiments. The following cases are also included in the present invention.

For example, the present invention may be a computer system including a microprocessor and memory. The memory stores the above-described computer programs, and the microprocessor operates according to the computer programs. For example, the computer system may include a computer program of the processing in the gas inspection management system 1 of the present disclosure or its components, and operate according to the program (or instruct each connected part to operate).

The present invention also includes a case where all or part of the processing in the gas inspection management system 1 or its components is configured by a computer system including a microprocessor, a recording medium such as ROM or RAM, a hard disk unit, etc. The RAM or the hard disk unit stores a computer program for achieving the same operation as that of each of the above devices. The microprocessor operates in accordance with the computer program, whereby each device achieves its functions.

Part or all of the components constituting each of the above-described devices may be a single system large-scale integration (LSI). The system LSI is a super multifunctional LSI manufactured by integrating a plurality of components on a single chip, and specifically, is a computer system including a microprocessor, ROM, RAM, etc. These may be individually implemented on a single chip, or part or all of them may be inclusively implemented on a single chip. The RAM stores a computer program for achieving the same operation as that of each of the above-described devices. The microprocessor operates in accordance with the computer program, whereby the system LSI achieves its functions. For example, the present invention also includes a case where processing in the gas inspection management system 1 or its components is stored as a program of an LSI, and the LSI is inserted into a computer to execute a predetermined program (the gas inspection management method).

A technique for implementation on an integrated circuit is not limited to an LSI, and a dedicated circuit or a general-purpose processor may be used. A field-programmable gate array (FPGA) that can be programmed after the manufacturing of an LSI or a reconfigurable processor in which connections and settings of circuit cells inside an LSI can be reconfigured may be used.

Further, if an integrated circuit implementation technology that replaces LSI appears due to the progress of the semiconductor technology or another derivative technology, the functional blocks may be integrated using that technology as a matter of course.

Part or all of the functions of the gas inspection management system 1 or its components according to each embodiment may be implemented by a processor such as a CPU executing a program. A non-temporary computer-readable recording medium may be used in which a program for implementing the operation of the gas inspection management system 1 or its components is recorded. A program or a signal may be recorded on a recording medium and transferred so that the program is executed by another independent computer system. It is needless to say that the program can be distributed via a transmission medium such as the Internet.

The gas inspection management system 1 according to the above embodiments or its components may be implemented by a programmable device such as a CPU, a graphics processing unit (GPU), or a processor, and software. These components may be provided as a single circuit component, or may be provided as an assemblage of a plurality of circuit components. A plurality of components may be combined into a single circuit component, or may be provided as an assemblage of a plurality of circuit components.

(9) The division of the functional blocks is an example. A plurality of functional blocks may be provided as a single functional block, or a single functional block may be divided into a plurality of functional blocks, or some functions may be transferred to other functional blocks. Further, the functions of a plurality of functional blocks having similar functions may be processed in parallel or in a time-division manner by a single piece of hardware or software.

The orders in which the above-described steps are executed are an example to specifically describe the present invention. Other orders may be used. Part of the above-described steps may be executed simultaneously (in parallel) with another step.

At least part of the functions of each embodiment and its modifications may be combined. Furthermore, the numbers used above are all examples to specifically describe the present invention, and the present invention is not limited to the example numbers.

CONCLUSION

As described above, the gas inspection management system according to one or more embodiments includes: the inspection information database that stores inspection results and information on links to inspection images for a plurality of objects of inspection; the access condition input unit that accepts input of an access request and condition specification from a manager; the inspection information acquisition unit that selects part or all of the plurality of objects of inspection from the inspection information database, based on the access request, and acquires information on inspection results and information on links to inspection images for the selected objects of inspection; the display image generation unit that generates a display image including the information on the inspection results and the information on the links to the inspection images for the selected objects of inspection; and the display unit that displays the display image.

With this configuration, by displaying information on the results of inspections of objects of inspection in association with inspection images, it is possible to display the statuses of gas-leak occurrence and restoration in gas facilities as the objects of inspection in an easy-to-understand manner. As a result, the manager of the gas facilities can accurately grasp the gas-leak statuses of the gas facilities.

According to another mode, in one of the above-described modes, the inspection information database may also store location information on the plurality of objects of inspection, the inspection information acquisition unit may acquire a map image of an area including the objects of inspection, and location information on the selected objects of inspection from the inspection information database, and the display image generation unit may plot status identification information on the objects of inspection that varies in display mode depending on the inspection results, and the information on the links to the inspection images on the map of the area including the objects of inspection, based on the location information on the selected objects of inspection.

With this configuration, by displaying information on the results of inspections of objects of inspection on a map, the manager can find at a glance the results of inspections of facilities or equipment in a map form. Thus, the manager of the gas facilities can accurately grasp the distribution of pieces of equipment in which gas leaks have occurred in gas facilities, and can effectively use it for efficient planning of reinspection and restoration.

According to another mode, in one of the above-described modes, when the operation input unit accepts operation input to specify a piece of the information on the links to the inspection images, the display image generation unit may acquire inspection images based on the specified piece of the link information, and generate a display image including the acquired inspection images.

This configuration allows the manager to easily check inspection images on which inspection results (statuses) indicated by icons of objects of inspection have been based. Thus, the manager of the gas facilities can efficiently evaluate and verify the reliability of the results of inspections by an inspector.

According to another mode, in one of the above-described modes, the condition specification may be information specifying one or more conditions selected from an object of inspection, an inspection date, a person in charge of inspection, and an inspection result.

This configuration allows the manager to issue an access request with desired conditions specified from an object of inspection, an inspection date, a person in charge of inspection, and an inspection result, to display the inspection results (statuses) of objects of inspection based on various viewpoints to grasp the statuses of the gas facilities.

According to another mode, in one of the above-described modes, the condition specification may be information specifying an object of inspection, and the display image generation unit may generate a display image in which results of inspections in the specified object of inspection are listed in time series.

This configuration allows the manager to easily grasp a history of inspection results (statuses) of the specified specific object of inspection, and to quickly and accurately grasp changes in the status of the object of inspection.

According to another mode, in one of the above-described modes, the condition specification may be information specifying "leak" inspection results, and the display image generation unit may generate a display image including a list on which the "leak" inspection results and information on links to inspection images corresponding to the inspection results are arranged.

The process to display abnormal facilities on a map allows the manager to easily check inspection images on which "leak" inspection results (statuses) indicated by icons have been based for multiple appropriate components.

Further, the process to display abnormal facilities on a list allows the manager to easily display and check inspection images on which inspection results (statuses) indicated by listed symbols have been based, for abnormal facilities to which multiple appropriate components belong easily.

According to another mode, in one of the above-described modes, the condition specification may be information specifying objects of inspection and latest inspection results, and the display image generation unit may generate a display image including the latest inspection results and information on links to inspection images corresponding to the inspection results for the objects of inspection.

This configuration allows the manager to easily grasp the latest inspection results (statuses) of objects of inspection macroscopically, and to quickly and accurately grasp objects of inspection requiring repair.

According to another mode, in one of the above-described modes, the condition specification may be information specifying objects of inspection and a period of interest, and the display image generation unit may calculate frequencies of occurrence of "leak" inspection results in inspection results in the objects of inspection in the period of interest, and generate a display image also including information indicating the respective frequencies of occurrence of the "leak" inspection results for the objects of inspection.

This configuration allows the manager to easily grasp the statuses of objects of inspection in a period of interest, and to quickly and accurately grasp objects of inspection requiring repair and their priorities.

According to another mode, in one of the above-described modes, the objects of inspection may include a plurality of higher-level inspection objects and a plurality of lower-level inspection objects included in each of the higher-level inspection objects, the inspection results may include the result of an inspection of each of the plurality of lower-level inspection objects, and the display image generation unit, when the result of an inspection in at least one of the lower-level inspection objects included in each higher-level inspection object is a "leak" inspection result, may generate a display image in which the "leak" inspection result in the lower-level inspection object is displayed as an inspection result in the higher-level inspection object.

With this configuration, based on the criterion that at least one lower-level inspection object included in a higher-level inspection object has a "leak" inspection result, the manager can easily grasp the inspection result status of a higher-level inspection object including a plurality of lower-level inspection objects with speed and accuracy, and ensure the safety of the objects of inspection.

The gas inspection management method according to one or more embodiments includes: a step of accepting operation input to accept input of an access request and condition specification from a manager; a step of selecting, from the inspection information database storing inspection results and information on links to inspection images for a plurality of objects of inspection, part or all of the plurality of objects of inspection, based on the access request, and acquiring information on inspection results and information on links to inspection images for the selected objects of inspection; a step of generating a display image including information on the inspection results and the information on the links to the inspection images for the selected objects of inspection; and a step of displaying the display image.

This configuration can provide the gas inspection management method for displaying information on the results of inspections of objects of inspection in association with inspection images.

The gas inspection management program according to one or more embodiments is a gas inspection management program that causes a computer to perform gas inspection management processing in the monitoring terminal of the gas inspection management system, the gas inspection management processing including: a step of accepting operation input to accept input of an access request and condition specification from a manager who operates the monitoring terminal; a step of selecting, from the inspection information database storing inspection results and information on links to inspection images for a plurality of objects of inspection, part or all of the plurality of objects of inspection, based on the access request, and acquiring information on inspection results and information on links to inspection images for the selected objects of inspection; a step of generating a display image including information on the inspection results and the information on the links to the inspection images for the selected objects of inspection; and a step of displaying the display image.

This configuration can provide the gas inspection management program for the monitoring terminal of the gas inspection management system that displays information on the results of inspections of objects of inspection in association with inspection images.

<<Supplement>>

Each embodiment described above shows a preferred specific example of the present invention. The numerical values, the components, the arrangement positions and connection forms of the components, the processing methods, the orders of the process steps, etc. described in the embodiments are an example, and are not intended to limit the present invention. Of the components in one or more embodiments, those not described in the independent claims that describe the broadest concept of the present invention are described as optional components constituting more preferred forms.

The order in which the above method is executed is an example to specifically describe the present invention. Other orders may be used. Part of the above method may be executed simultaneously (in parallel) with another method.

To facilitate the understanding of the invention, the scales of the components in the drawings described in the above embodiments may be different from actual ones. The present invention is not limited by the description of the above embodiments, and can be appropriately changed without departing from the gist of the present invention.

INDUSTRIAL APPLICABILITY

The gas inspection management system, the gas inspection management method, and the program according to one or more embodiments of the present disclosure can be applied widely to management systems that use gas leaks in gas facilities in inspection.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 1 gas inspection management system
10 inspection terminal
11 CPU,
12 inspection image acquisition unit
13 inspection information storage unit
14 communication unit
15 display unit
16 operation input unit
20 server device
21 CPU
22 communication unit
23 storage unit
30 inspection image storage device
40 monitoring terminal
41 CPU,
42 communication unit
43 storage unit
44 display unit
45 access condition input unit
50 imaging means
230 inspection information database
231 inspection condition information database
232 inspection result information database
233 inspection image link information database
234 inspection object location information database
235 map information database
236 inspection route information database
237, 131, 431 program

The invention claimed is:

1. A gas inspection management system, comprising:
an inspection information database that stores inspection results and information on links to inspection images for objects of inspection;
an access condition receiver that receives an input of an access request and an input of condition specification from a manager;
a hardware processor that:
selects part or all of the objects from the inspection information database, based on the access request,
acquires information on the inspection results and the information on the links for the selected objects, and
generates a display image including the information on the inspection results and the information on the links for the selected objects; and
a display that displays the display image.

2. The gas inspection management system according to claim 1, wherein the inspection information database also stores location information on the objects,
the hardware processor acquires a map image of an area including the objects, and location information on the selected objects from the inspection information database, and
the hardware processor plots status identification information on the objects that varies in display mode depending on the inspection results, and the information on the links on the map image of the area including the objects, based on the location information on the selected objects.

3. The gas inspection management system according to claim 1, wherein when an operation receiver receives an operation input to specify a piece of the information on the links, the hardware processor acquires inspection images based on the specified piece of the information, and generates a display image including the acquired inspection images.

4. The gas inspection management system according to claim 1, wherein the condition specification specifies one or more conditions selected from an object of inspection, an inspection date, a person in charge of inspection, and an inspection result.

5. The gas inspection management system according to claim 4, wherein
the condition specification specifies the object of inspection, and
the hardware processor generates a display image in which results of inspections in the specified object are listed in time series.

6. The gas inspection management system according to claim 4, wherein
the condition specification specifies leak inspection results, and
the hardware processor generates a display image including a list on which the leak inspection results and the information on the links corresponding to the inspection results are arranged.

7. The gas inspection management system according to claim 4, wherein
the condition specification specifies the objects and latest inspection results, and the hardware processor generates a display image including the latest inspection results and the information on the links corresponding to the inspection results for the objects.

8. The gas inspection management system according to claim 4, wherein
the condition specification specifies the objects and a period of interest, and
the hardware processor calculates frequencies of occurrence of leak inspection results in the inspection results in the objects in the period of interest, and generates a display image also including information indicating the frequencies of occurrence of the leak inspection results for the objects.

9. The gas inspection management system according to claim 1, wherein
the objects include higher-level inspection objects and lower-level inspection objects included in each of the higher-level inspection objects,
the inspection results include a result of an inspection of each of the of lower-level inspection objects, and
the hardware processor, when a result of an inspection in at least one of the lower-level inspection objects is a leak inspection result, generates a display image in which the leak inspection result in a lower-level inspection object is displayed as an inspection result in a higher-level inspection object.

10. A gas inspection management method, comprising:
receiving an input of an access request and an input of condition specification from a manager;
selecting, from an inspection information database storing inspection results and information on links to inspection images for objects of inspection, part or all of the of objects, based on the access request, and acquiring information on the inspection results and the information on the links for the selected objects;
generating a display image including the information on the inspection results and the information on the links for the selected objects; and
displaying the display image.

11. The gas inspection management method according to claim 10, wherein
the acquiring information further includes acquiring a map image of an area including the objects, and acquiring, from the inspection information database storing location information on the objects, the location information on the selected objects, and
in the generating the display image, status identification information on the objects that varies in display mode depending on the inspection results, and the information on the links are plotted on the map image of the area including the objects, based on the location information on the selected objects.

12. A non-transitory recording medium storing a computer readable gas inspection management instructions that cause a computer to perform gas inspection management processing in a monitoring terminal of a gas inspection management system, the gas inspection management processing comprising:
receiving an input of an access request and an input of condition specification from a manager who operates the monitoring terminal;
selecting, from an inspection information database storing inspection results and information on links to inspection images for objects of inspection, part or all of the objects, based on the access request, and acquiring information on the inspection results and the information on the links for the selected objects;
generating a display image including the information on the inspection results and the information on the links for the selected; and
displaying the display image.

13. The non-transitory recording medium according to claim 12, wherein
the acquiring information further includes acquiring a map image of an area including the objects, and acquiring, from the inspection information database storing location information on the objects, the location information on the selected objects, and
in the generating the display image, status identification information on the objects that varies in display mode depending on the inspection results, and the information on the links are plotted on the map of the area including the objects, based on the location information on the selected objects.

14. The gas inspection management system according to claim 2, wherein when an operation receiver receives an operation input to specify a piece of the information on the links, the hardware processor acquires inspection images based on the specified piece of the information, and generates a display image including the acquired inspection images.

15. The gas inspection management system according to claim 2, wherein the condition specification specifies one or more conditions selected from an object of inspection, an inspection date, a person in charge of inspection, and an inspection result.

16. The gas inspection management system according to claim 2, wherein
the objects include higher-level inspection objects and lower-level inspection objects included in each of the higher-level inspection objects,
the inspection results include a result of an inspection of each of the lower-level inspection objects, and
the hardware processor, when a result of an inspection in at least one of the lower-level inspection objects is a leak inspection result, generates a display image in which the leak inspection result in a lower-level inspection object is displayed as an inspection result in a higher-level inspection object.

17. The gas inspection management system according to claim 3, wherein the condition specification specifies one or more conditions selected from an object of inspection, an inspection date, a person in charge of inspection, and an inspection result.

18. The gas inspection management system according to claim 3, wherein
the objects include higher-level inspection objects and lower-level inspection objects included in each of the higher-level inspection objects,
the inspection results include a result of an inspection of each of the lower-level inspection objects, and
the hardware processor, when a result of an inspection in at least one of the lower-level inspection objects is a leak inspection result, generates a display image in which the leak inspection result in a lower-level inspection object is displayed as an inspection result in a higher-level inspection object.

19. The gas inspection management system according to claim 4, wherein
the objects include higher-level inspection objects and lower-level inspection objects included in each of the higher-level inspection objects, the inspection results include a result of an inspection of each of the lower-level inspection objects, and the hardware processor, when a result of an inspection in at least one of the lower-level inspection objects is a leak inspection result, generates a display image in which the leak inspection result in a lower-level inspection object is displayed as an inspection result in a higher-level inspection object.

20. The gas inspection management system according to claim 5, wherein the objects include higher-level inspection objects and lower-level inspection objects included in each of the higher-level inspection objects, the inspection results include a result of an inspection of each of the lower-level inspection objects, and the hardware processor, when a result of an inspection in at least one of the lower-level inspection objects is a leak inspection result, generates a display image in which the leak inspection result in a lower-level inspection object is displayed as an inspection result in a higher-level inspection object.

\* \* \* \* \*